United States Patent
Shinohara et al.

(10) Patent No.: US 12,402,171 B2
(45) Date of Patent: **\*Aug. 26, 2025**

(54) WIRELESS COMMUNICATION SYSTEM AND WIRELESS COMMUNICATION METHOD

(71) Applicant: NIPPON TELEGRAPH AND TELEPHONE CORPORATION, Tokyo (JP)

(72) Inventors: Shoko Shinohara, Yokosuka (JP); Yasuhiko Inoue, Yokosuka (JP); Junichi Iwatani, Yokosuka (JP); Masato Mizoguchi, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/585,165

(22) Filed: Feb. 23, 2024

(65) Prior Publication Data

US 2024/0196438 A1    Jun. 13, 2024

Related U.S. Application Data

(63) Continuation of application No. 17/885,345, filed on Aug. 10, 2022, now Pat. No. 11,943,810, which is a
(Continued)

(30) Foreign Application Priority Data

Oct. 5, 2015   (JP) .................................. 2015-197969

(51) Int. Cl.
  H04W 74/0816   (2024.01)
  H04L 1/00   (2006.01)
  (Continued)

(52) U.S. Cl.
  CPC ....... *H04W 74/0816* (2013.01); *H04L 1/0021* (2013.01); *H04W 16/08* (2013.01);
  (Continued)

(58) Field of Classification Search
  CPC ........... H04W 74/0816; H04W 72/541; H04W 16/08; H04W 28/06; H04W 48/02; H04W 84/12; H04L 1/0021
  See application file for complete search history.

(56) References Cited

U.S. PATENT DOCUMENTS 7,864,744 B2   1/2011  Song et al.
9,854,607 B1 *  12/2017  Chu .................... H04W 74/002
(Continued)

FOREIGN PATENT DOCUMENTS

KR   1020050119107 A   12/2005
WO   WO-2014/182065 A1   11/2014
WO   WO-2016002802 A1 *  1/2016   ............ H04W 72/00

OTHER PUBLICATIONS

Robert Stacey, et al.: "Proposed Specification Framework for TGax"; Doc .: IEEE802.11-14/1453r2.
(Continued)

Primary Examiner — Michael J Moore, Jr.
(74) Attorney, Agent, or Firm — Harness, Dickey & Pierce, P.L.C.

(57) ABSTRACT

A format that includes a BSSID of a transmitting station within a preamble of the frame is an HE format, and a format that does not include a BSSID within the preamble but includes a BSSID in a MAC header is a Non-HE format; and a wireless station in the BSS includes a control part which checks a format of a frame received at a predetermined receiver sensitivity or above, and continues demodulation of the received frame if the format is HE format and the BSSID in the received frame is consistent with its own BSS, and
(Continued)

stops the demodulation of the received frame if the HE format and the BSSID in the received frame is not consistent with its own BSS.

1 Claim, 13 Drawing Sheets

Related U.S. Application Data continuation of application No. 16/914,902, filed on Jun. 29, 2020, now Pat. No. 11,432,327, which is a continuation of application No. 15/764,171, filed as application No. PCT/JP2016/079667 on Oct. 5, 2016, now Pat. No. 10,743,346.

(51) Int. Cl.
*H04W 16/08* (2009.01)
*H04W 28/06* (2009.01)
*H04W 72/541* (2023.01)
*H04W 48/02* (2009.01)
*H04W 84/12* (2009.01)

(52) U.S. Cl.
CPC ......... *H04W 28/06* (2013.01); *H04W 72/541* (2023.01); *H04W 48/02* (2013.01); *H04W 84/12* (2013.01)

(56) References Cited

U.S. PATENT DOCUMENTS

| | | | |
|---|---|---|---|
| 10,172,137 B1* | 1/2019 | Hedayat | H04W 74/02 |
| 10,321,483 B1* | 6/2019 | Moon | H04W 74/0808 |
| 2004/0235439 A1 | 11/2004 | Husted et al. | |
| 2015/0264617 A1 | 9/2015 | Choudhury et al. | |
| 2015/0282043 A1* | 10/2015 | Fang | H04W 72/542 |
| | | | 370/329 |
| 2015/0327276 A1 | 11/2015 | Rebeiz et al. | |
| 2016/0044533 A1 | 2/2016 | Seok | |
| 2016/0050674 A1* | 2/2016 | Kenney | H04W 84/12 |
| | | | 370/329 |
| 2016/0056943 A1 | 2/2016 | Stacey et al. | |
| 2016/0072654 A1 | 3/2016 | Choi et al. | |
| 2016/0165524 A1 | 6/2016 | Kim et al. | |
| 2016/0174254 A1 | 6/2016 | Hedayat | |
| 2016/0212247 A1 | 7/2016 | Azizi et al. | |
| 2017/0041952 A1 | 2/2017 | Kim et al. | |
| 2017/0079068 A1* | 3/2017 | Ahmed | H04W 74/0816 |
| 2017/0163395 A1 | 6/2017 | Kwak et al. | |
| 2017/0164406 A1* | 6/2017 | Son | H04B 17/318 |
| 2017/0208546 A1 | 7/2017 | Park et al. | |
| 2017/0289987 A1* | 10/2017 | Seok | H04W 74/00 |
| 2017/0347376 A1* | 11/2017 | Sakai | H04W 74/0808 |
| 2018/0227952 A1 | 8/2018 | Kim et al. | |
| 2018/0270038 A1* | 9/2018 | Oteri | H04L 5/0044 |
| 2019/0230533 A1* | 7/2019 | Huang | H04L 43/16 |

OTHER PUBLICATIONS

"Part 11: Wireless LAN Medium Access Control (MAC) and Physical (PHY) Layer Specifications"; IEEE Std 802.11ac(TM)-2013; IEEE Standard for Information technology—Telecommunications anf information exchange between systems Local and metropolitan area networks.
Graham Smith; "Dynamic Sensitivity Control Practical Usage"; IEEE 802.11-14/0779r2.
Shoko Shinohara et al., "Improvement of receiver behavior for dynamic sensitivity control technique in high efficiency wireless LAN", IEICE Technical Report, vol. 115, No. 206, Aug. 25, 2015 (Aug. 25, 2015), pp. 155 to 160, with English abstract.
Yasuhiko Inoue, et al., Number of BSS Color bits, doc.: IEEE 802.11-15/1075rl, IEEE, Internet<URL:https://mentor.ieee.org/802.11/dcn/15/11-15-1075-01-00ax-number-of-bss-color-bits.pptx>, Sep. 14, 2015.
Alfred Asterhadhi, et al., Identifiers in HE PPDUs for power saving, doc.: IEEE 802.11-15/1122r0, IEEE, Internet<URL:https://mentor.ieee.org/802.11/dcn/15/11-15-1122-00-00ax-identifiers-in-he-ppdus-for-power-saving.pptx>, Sep. 12, 2015.
International Search Report for PCT/JP2016/079667, ISA/JP, Tokyo, mailed Dec. 13, 2016, with English translation.
International Preliminary Report on Patentability (Ch. I) for PCT/JP2016/079667, IB, Geneva, with its English translation issued Apr. 10, 2018, incorporating the English Translation of the Written Opinion of the ISA, ISA/JP, mailed Dec. 13, 2016.
Yasuhiko Inoue et al.(NTT): "Discussion on the Receiver Behavior for CCAC DSC with BSS Color"; 11-15-0595-02-OOax, IEEE Draft; 11-15-0595-02-OOAX, IEEE-SA Mentor, Piscataway, NJ USA, 802.11ax, pp. 1-13, May 12, 2015.
Takeshi Itagaki et al. (SONY):"Dynamic CCA control and TPC Simulation Results with SS1-SS3"; 11-15-1045-01-00ax, IEEE Draft; 11-15-1045-01-00AX, IEEE-SA Mentor, Piscataway, NJ USA, 802.11ax, pp. 1-53, Sep. 18, 2015.
Extended European Search Report regarding EPSN 168536464, mailed Mar. 26, 2019.
Korean Office Action regarding KRSN 1020187008527, dated Apr. 25, 2019.
Japanese Office Action regarding JPSN 2017544537, dated May 14, 2019.
Japanese Office Action from counterpart JP2017544537, dated Dec. 17, 2019.
Mori, Masahito et al. "DSC/DCCA Calibration with TGax Agreed Scenarios", IEEE 802.11-15/1101r0, dated Sep. 14, 2015.
Coffey, Sean et al., "A Protocol Framework For Dynamic CCA", IEEE 802.11-14/0872r0, Jul. 14, 2014.
U.S. Appl. No. 17/885,345, filed Aug. 10, 2022.
U.S. Appl. No. 16/914,902, filed Jun. 29, 2020.
U.S. Appl. No. 15/764,171, filed Mar. 28, 2018.

* cited by examiner

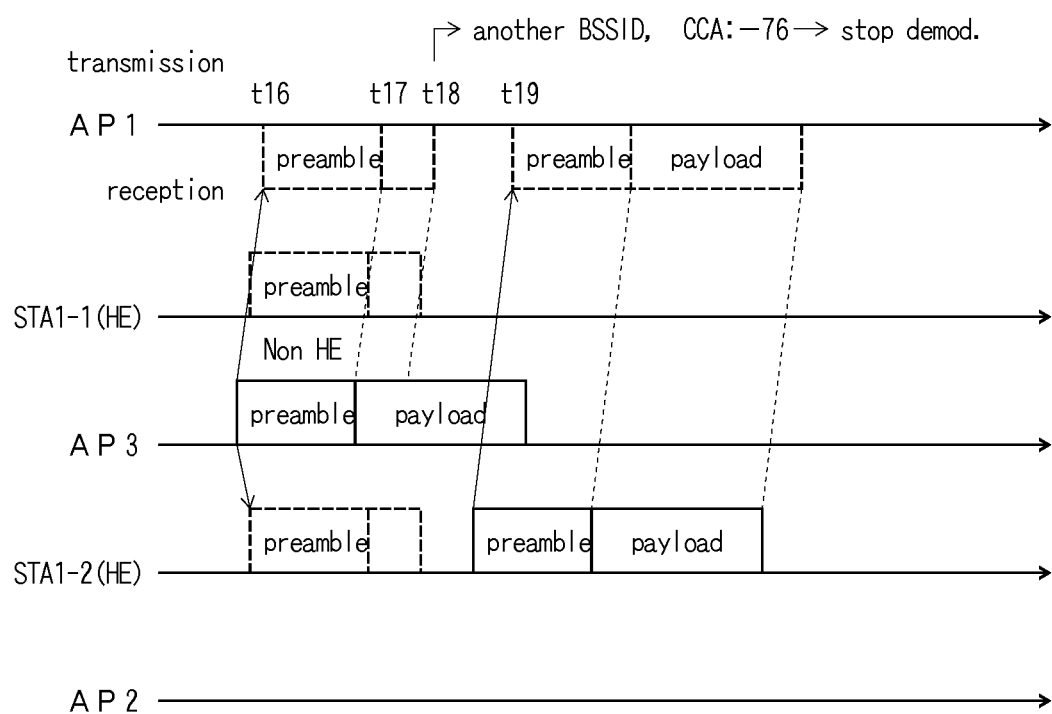
F I G. 7

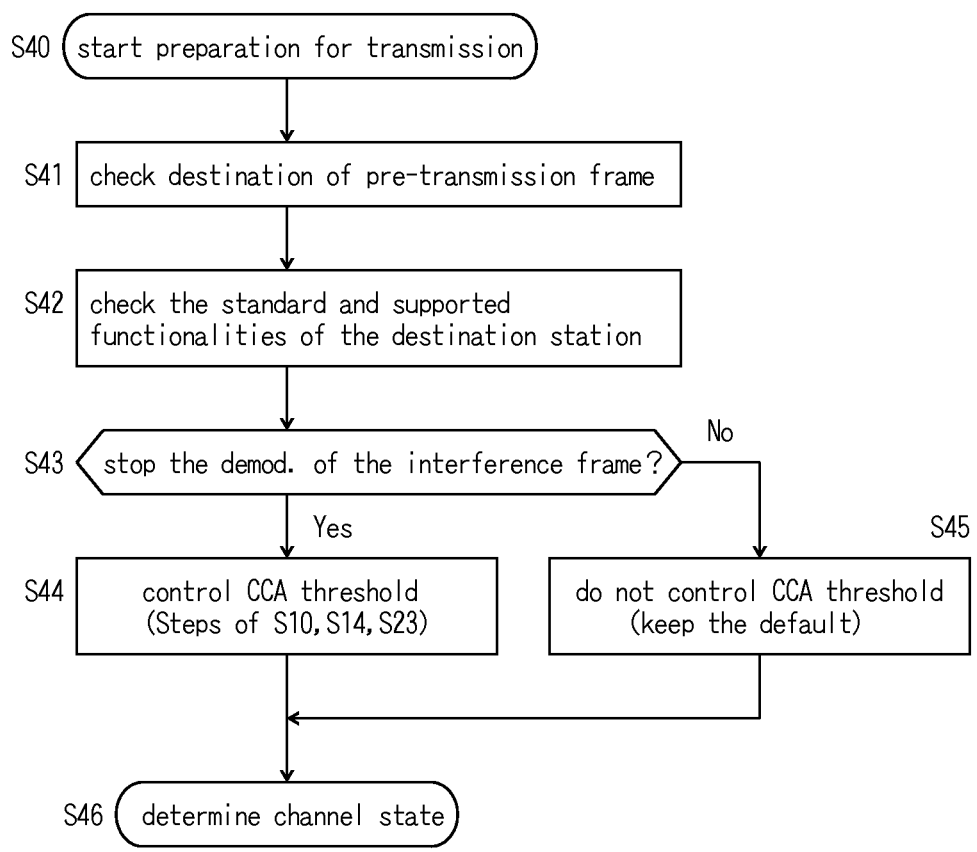
F I G. 1 0

FIG. 11
(1) example of S44
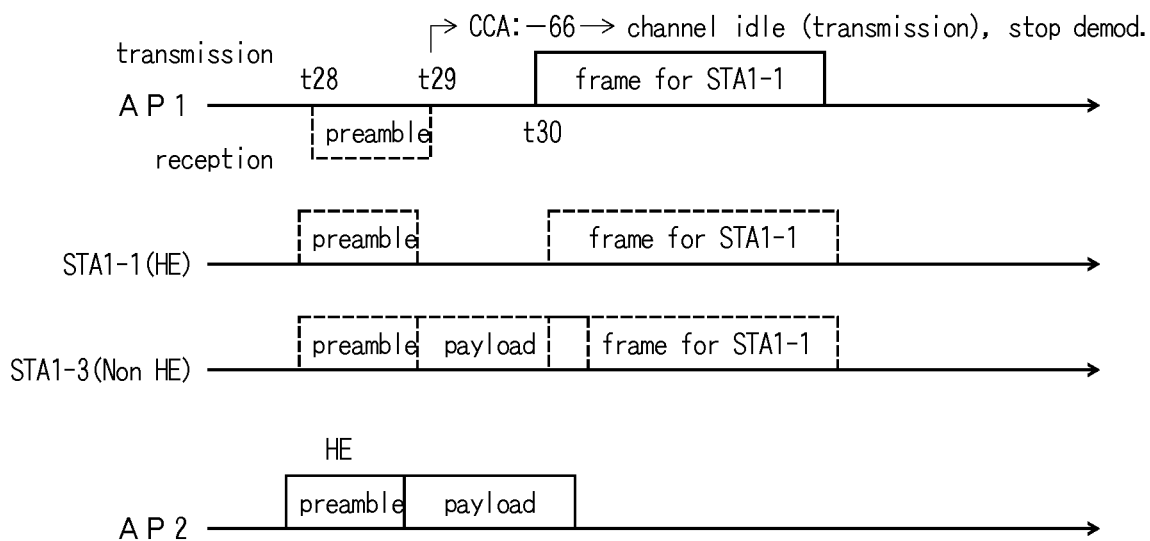
(2) example of S45
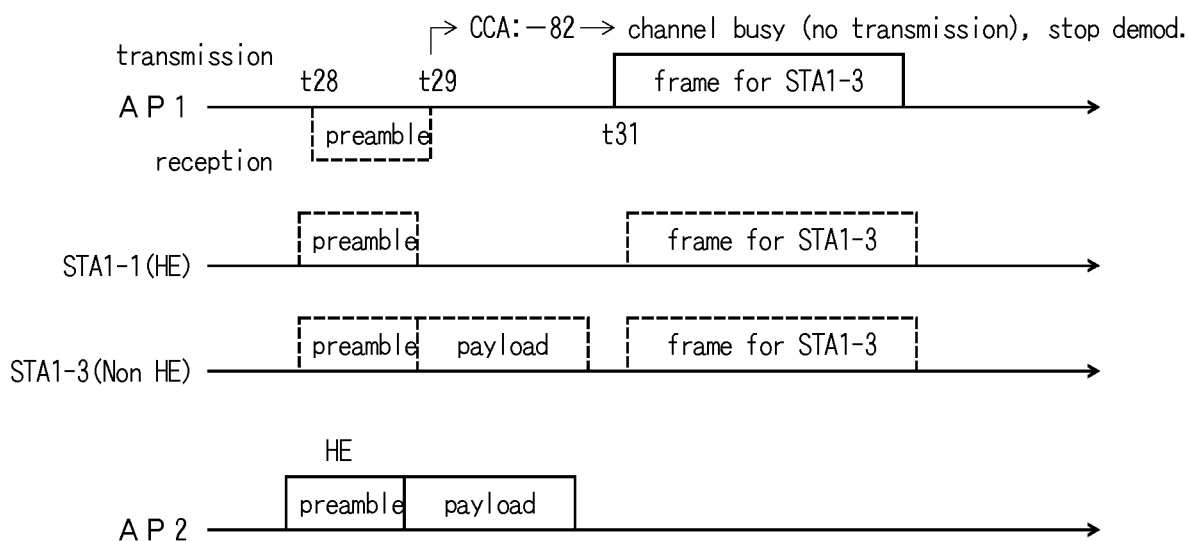

PRIOR ART
FIG. 14
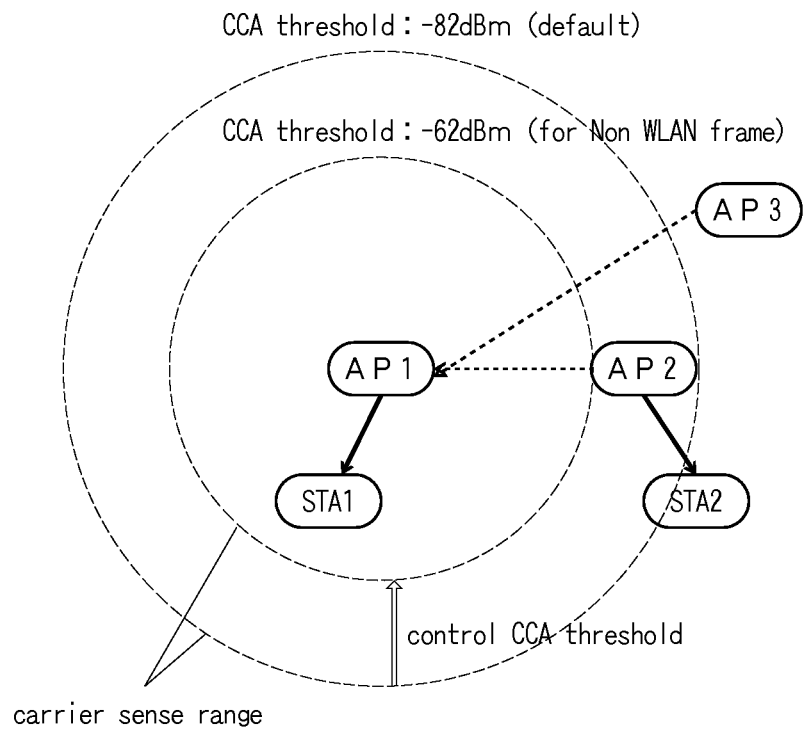
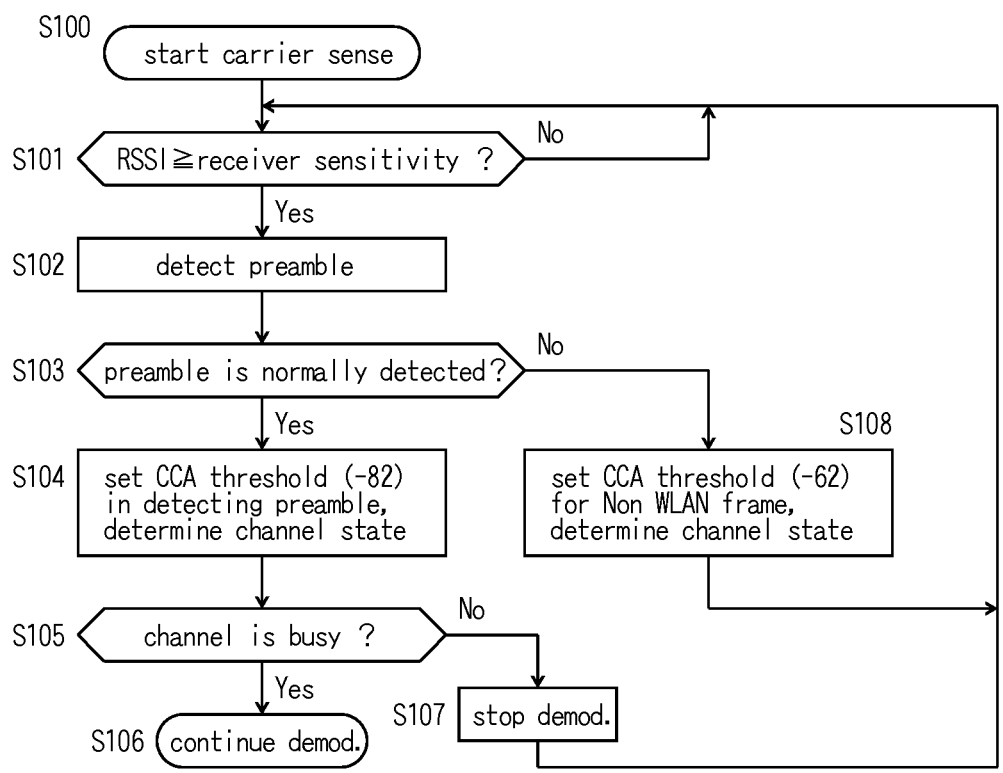

WIRELESS COMMUNICATION SYSTEM AND WIRELESS COMMUNICATION METHOD

CROSS REFERENCE TO RELATED APPLICATION

This application is a continuation of U.S. application Ser. No. 17/885,345, filed Aug. 10, 2022, which is a continuation of U.S. application Ser. No. 16/914,902, filed Jun. 29, 2020, which issued as U.S. Pat. No. 11,432,327 and is a continuation of U.S. application Ser. No. 15/764,171, filed Mar. 28, 2018, which issued as U.S. Pat. No. 10,743,346 and is a U.S. National Stage application claiming the benefit of prior filed International Application Number PCT/JP2016/079667, filed on Oct. 5, 2016, in which the International Application claims priority from Japanese Patent Application Number 2015-197969, filed on Oct. 5, 2015, the entire contents of which are incorporated herein by reference.

TECHNICAL FIELD

The present invention relates to a wireless communication system and a wireless communication method that mitigates a decrease in throughput due to carrier sense multiple access with collision avoidance (CSMA/CA) protocol carried out by each wireless station, in a wireless local area network (LAN) high density environment.

BACKGROUND ART

In recent years, with the spread of a high-performance portable wireless station, such as a notebook computer or a smartphone, wireless LANs in compliance with the IEEE 802.11 standard have come into wide use not only in companies and public spaces, but also in ordinary houses. As the wireless LANs in compliance with the IEEE 802.11 standard, there are a wireless LAN in compliance with the standard IEEE 802.11b/g/n that uses a 2.4 GHz band, and a wireless LAN in compliance with the standard IEEE 802.11a/n/ac that uses a 5 GHz band.

At this point, in a wireless LAN high density environment where the number of basic service sets (BBSs) is greater than the number of channels that are available at the same time in the same place, a plurality of BSSs use the same channel. In that case, due to interference among the BSSs that use the same channel, throughput of the BSS and throughput of an entire system are decreased. For this reason, in the wireless LAN, autonomous distributed access control called CSMA/CA that performs transmission of data only when the channel is unoccupied.

However, although the CSMA/CA protocol is performed, in the wireless LAN high density environment where many wireless LAN networks use the same channel, because the frequency with which the channel is busy due to the carrier sense is increased, a transmission opportunity (an opportunity to obtain the channel access right) is reduced, and throughput is reduced.

When the wireless station performs the carrier sense, a clear channel assessment (CCA) threshold, based on which it is determined whether a channel is idle or busy, using a received signal strength indication (RSSI) of a receive signal, is set. With dynamic sensitivity control (DSC) that dynamically controls the CCA threshold, a technique in which a state where more defer transmission than is necessary take place is removed and thus the transmission opportunity is increased has been studied (Non-Patent Documents 1, 2, and 3). A control example of the CCA threshold will be described below, taking, for example, downlink communication from an AP to an STA in which the access point and the station are defined as the AP and the STA, respectively.

FIG. 14 illustrates a control example of the CCA threshold in the related art.

In FIG. 14, an AP 1 and an STA 1, an AP 2 and an STA 2, and an AP 3 make up different BSSs, respectively. The AP 1 possibly selects a default CCA threshold of −82 dBm and a CCA threshold of −62 dBm for a Non-WLAN frame. When a signal that is detected by carrier sense in accordance with the default CCA threshold is, for example, a signal other than a signal for a wireless LAN, the AP 1 performs control in such a manner that changing to a CCA threshold for a Non-WLAN frame takes place and thus a carrier sense range is narrowed down, thereby increasing a transmission opportunity. An example is described here in which the AP 2 is located within a carrier sense range in accordance with two CCA thresholds of the AP 1 and in which the AP 3 is located out of a carrier sense range in accordance with the default CCA threshold.

The AP 1 starts to perform carrier sense at the default CCA threshold of −82 dBm (S100), and, if a RSSI of a receive signal is at a receiver sensitivity of −82 dBm or less (Yes in S101), detects a preamble of the receive signal (S102). If the preamble is normally detected (Yes in S103), a channel state where setting to the default CCA threshold at which the detection of the preamble is successful takes place is determined as is (S104). At this point, if a channel is busy (Yes in S105), demodulation of the receive signal is continued (S106), and if the channel is idle (No in S105), the demodulation of the receive signal is stopped (S107). On the other hand, if the preamble is not normally detected (No in S103), changing to the CCA threshold of −62 dBm for the Non-WLAN frame takes place and a transmission opportunity is caused to be increased by narrowing down the carrier sense range and determining the channel state (S108).

In the CCA threshold control described above, in the AP 1, even if the preamble can be normally detected when a signal of the AP 3 is at receiver sensitivity or above, the channel is determined to be idle by setting the CCA threshold to the default value, and the demodulation is stopped. Thus, the transmission opportunity can be caused to be increased. That is, the AP 1 and the AP 3 possibly perform simultaneous transmissions with mutual interference being decreased. On the other hand, regarding a signal of the AP 2, the channel is busy by causing the setting to the default CCA threshold to take place. The AP 1 continues the demodulation of the signal of the AP 2 and defers transmission. At this point, although the simultaneous transmissions from the AP 1 to the STA 1 and from the AP 2 to the STA 2 are possible, the detection of the signal of the AP 2 causes the AP 1 to defer transmission and to be in a state of a so-called exposed station. For example, regarding the AP 1, if it can be detected that a signal of another BSS is present and if the CCA threshold is controlled in a manner that causes the CCA threshold to be high and the corresponding carrier sense range is narrowed down, although the AP 2 is performing the transmission, the simultaneous transmission by the AP 1 is possible and system throughput is improved.

However, if the STA 1 is located near the AP 2 and an interference signal from the AP 2 is large in magnitude, although the control of the CCA threshold in the AP 1 causes the transmission opportunity of the AP1 to be increased, there is a concern that a receive failure will occur in the STA 1 due to the interference signal from the AP 2, thereby instead decreasing throughput.

Furthermore, in the AP 1, if a signal that is transmitted by the STA 1 under control is received, or if a beacon frame that is transmitted by the AP 2 is received, it can be said that the AP 1 may be kept from performing the transmission and perform the reception, rather than controlling the CCA threshold and increasing the transmission opportunity. That is, it is desirable that the AP 1 distinguishes between the signal from the STA 1 in the BSS that the AP 1 itself makes up, and the signal from the AP 2 in another BSS, and that AP 1 can select whether or not the CCA threshold is controlled and thus the simultaneous transmissions are set to be possible, depending on whether or not the demodulation of the signal from the AP 2 in the another BSS is also necessary.

Non-Patent Document 1: "Proposed Specification Framework for TGax", Robert Stacey et al., doc.:IEEE 802.11-14/1453r2, 5 Nov. 2014

Non-Patent Document 2: The LAN/MAN Standards Committee", IEEE Std 802.11TM 2012 IEEE standard for Information Technology—Telecommunications and information exchange between systems—Local and metropolitan area networks Specific requirements Part11:Wireless LAN Medium Access Control (MAC) and Physical PHY.

Non-Patent Document 3: Graham Smith, "Dynamic Sensitivity Control Practical Usage", doc.: IEEE 802.11-14/0779r2

Disclosure Problems to be Solved

Incidentally, a technology has been considered in which a high efficiency (HE) format that includes a field of a BSS identifier (BSSID) within a PHY preamble of a wireless LAN frame is used to determine whether a signal is a signal of a BSS that the wireless station itself makes up and a signal of another BSS, and in which simultaneous transmissions are performed in such a manner that throughput can be maximized.

Wireless stations, an AP and an STA, which possibly transmit and receive a frame in an HE format, are defined as HE stations. On the other hand, a format in the related art, which does not include a field for a BSSID and includes a preamble, such as L-SIG, L-STF, and L-LTF is a Non-HE format, and wireless stations, an AP and an STA that do not particularly have a function of transmitting and receiving a frame in the HE format, but possibly transmit and receive a frame in Non-HE format are defined as Non-HE stations.

FIG. 15 illustrates an example of a configuration of wireless communication system in which a wide variety of stations are present.

In FIG. 15, a transmitting station 11 is the HE station, and destination stations 12 and 13 that are in the same BSS as the transmitting station 11, are set to be the HE station and the Non-HE station, respectively. That is, the transmitting station 11 transmits a frame in the HE format or a frame in the Non-HE format in compliance with standards for the destination station. An interfering station 14 that is an interfering source for the transmitting station 11 and the destination station 12 is the HE station, and an interfering station 15 that is an interfering source for the transmitting station 11 and the destination station 13 is the Non-HE station.

At this point, the transmitting station 11 distinguishes between a frame in the HE format that is transmitted from the interfering station 14, and a frame in the Non-HE format that is transmitted from the interfering station 15. Moreover, if the frame in the HE format is present, the BSSID is detected. Then, depending on whether the detected BSSID is consistent with a BBS that the transmitting station 11 makes up, it is determined whether or not the simultaneous transmissions are possible, or it is determined whether or not the simultaneous transmissions are kept from being performed and the frame has to be received.

For example, the transmitting station 11 recognizes the frame in the HE format that is transmitted from the interfering station 14. If it is determined that a signal of another BSS is present, the transmitting station 11 stops the demodulation and possibly performs transmission to the destination stations 12 and 13. At this time, in the same manner, if the demodulation is stopped, the destination station 12 that can recognize the frame in the HE format possibly perform the reception from the transmitting station 11 as well, but because the destination station 13 cannot recognize the frame in the HE format, the destination station 13 continues the reception without any processing. In this case, the transmitting station 11 recognizes the frame in the HE format from the interfering station 14, stops the demodulation, and transmits the frame in the Non-HE format to the destination station 13. Although this is the case, there is a likelihood that the reception will fail in the destination station 13 which is continuing the reception of the frame from the interfering station 14. That is, the transmitting station 11 effectively performs control in which in compliance with a signal from the interfering station 14 and standards for the destination stations 12 and 13, it is determined whether or not the simultaneous transmissions are performed, and in which the simultaneous transmissions are allowed for the destination station 12 that is the HE station and the simultaneous transmissions are disallowed for the destination station 13 that is the Non-HE station.

A proposition of the present invention is to provide a wireless communication system and a wireless communication method that are capable of efficiently acquiring a transmission opportunity with control of a CCA threshold in a wireless LAN high density environment in which an HE station and a Non-HE station are mixedly present, and are capable of not only improving system throughput and but also efficiently acquiring a management frame necessary for information collection, such as a beacon frame.

Means for Solving the Problems

According to a first invention, there is provided a wireless communication system in which a plurality of adjacent BSSs, made of a plurality of wireless stations, which transmit and receive a frame using a predetermined channel, are present and in which a transmitting station of each BSS performs wireless communication by access control based on CSMA/CA using aCCA threshold considering an interference power from an interfering station which uses the predetermined channel, in which a format that includes a BSSID of a transmitting station within a preamble of the frame is an HE format, and a format that does not include a BSSID within the preamble but includes a BSSID in a MAC header is a Non-HE format; and the wireless station in the BSS includes a control part which checks a format of a received frame received at a predetermined receiver sensitivity or above, and continues demodulation of the received frame if the format is HE format and the BSSID in the received frame is consistent with its own BSS, and stops the demodulation of the received frame if the format is the HE format and the BSSID in the received frame is not consistent with its own BSS.

In the wireless communication system according to the first invention, the control part is configured to change the CCA threshold from a default value to a CCA threshold for the HE format and perform carrier sense when the received frame is in the HE format and the BSSID of the received frame is not consistent with its own BSS.

In the wireless communication system according to the first invention, the control part is configured, when a format of the received frame is the Non-HE format, to change the CCA threshold from a default value to a CCA threshold for the Non-HE format and perform carrier sense, and to continue the demodulation of the received frame if the predetermined channel is busy, and to stop the demodulation of the received frame if the predetermined channel is idle.

In the wireless communication system according to the first invention, the control part is configured, when a format of the received frame is the Non-HE format, to check the BSSID included in the received frame, to continue the demodulation of the received frame if the BSSID is consistent with its won BSS, and to stop the demodulation of the received frame if the BSSID is not consistent with its own BSS. Moreover, in the wireless communication system according to the first invention, the control part is configured to change the CCA threshold from a default value to a CCA threshold for the Non-HE format and perform carrier sense when the received frame is in the Non-HE format and the BSSID is not consistent with its own BSS.

In the wireless communication system according to the first invention, the control part is configured when a format of the received frame is the Non-HE format, to check a type of the received frame and to continue the demodulation if the type is a frame type or a frame subtype necessary for communication control of each the wireless station.

In the wireless communication system according to the first invention, the control part is configured to check a destination station to which a frame is scheduled to be transmitted, to control the CCA threshold to a value higher than a default value if the destination station and its own station can stop the demodulation of the received frame, and to not control the CCA threshold or the CCA threshold so that the frame can be receivable if the destination station and its own station cannot stop the demodulation of the received frame.

In the wireless communication system according to the first invention, the control part is configured to check a format of a frame scheduled to be transmitted, and to control the CCA threshold to a value higher than the default value if the format is the HE format, and to not control the CCA threshold or control the CCA threshold so that the frame can be receivable if the format is the Non-HE format.

In the wireless communication system according to the first invention, the control part is configured to check a type of a frame scheduled to be transmitted, and to not control the CCA threshold or control the CCA threshold so that the frame can be receivable if the type is a frame type or a frame subtype necessary for communication control of each wireless station, and to control the CCA threshold to a value higher than the default value if the type is not the frame type or the frame subtype necessary for the communication control of each wireless station.

According to a second invention, there is provided a wireless communication method in which a plurality of adjacent BSSs, made of a plurality of wireless stations, which transmit and receive a frame using a predetermined channel, are present and in which a transmitting station of each BSS performs wireless communication by access control based on CSMA/CA using a CCA threshold considering an interference power from an interfering station which uses the predetermined channel, in which a format that includes a BSSID of a transmitting station within a preamble of the frame is an HE format, and a format that does not include the BSSID within the preamble but includes a BSSID in a MAC header is a Non-HE format; and the wireless station in the BSS has a first step checking a format of a frame received at a predetermined receiver sensitivity or above; and a second step continuing demodulation of the received frame if the format is HE format and the BSSID in the received frame is consistent with its own BSS, and stopping the demodulation of the received frame if the format is the HE format and the BSSID in the received frame is not consistent with its own BSS.

In the wireless communication method according to the second invention, the second step further changes the CCA threshold from a default value to a CCA threshold for the HE format and performs carrier sense when the received frame is in the HE format and the BSSID of the received frame is not consistent with its own BSS.

In the wireless communication method according to the second invention, the second step further changes the CCA threshold from a default value to a CCA threshold for the Non-HE format and performs carrier sense when a format of the received frame is the Non-HE format; and continues the demodulation of the received frame if the predetermined channel is busy; and stops the demodulation of the received frame if the predetermined channel is idle.

In the wireless communication method according to the second invention, the second step further checks the BSSID included in the received frame when a format of the received frame is the Non-HE format; and continues the demodulation of the received frame if the BSSID is consistent with its own BSS; and stops the demodulation of the received frame if the BSSID is not consistent with its own BSS. In the wireless communication method according to the second invention, the second step changes the CCA threshold from a default value to a CCA threshold for the Non-HE format and performs carrier sense when the received frame is in the Non-HE format and the BSSID is not consistent with its own BSS.

In the wireless communication method according to the second invention, the second step checks a type of the received frame when a format of the received frame is the Non-HE format, and continues the demodulation if the type is a frame type or a frame subtype necessary for communication control of each the wireless station.

The wireless communication method according to the second invention further includes a third step checking a destination station to which a frame is scheduled to be transmitted, controlling the CCA threshold to a value higher than the default value if the destination station and its own station can stop the demodulation of the received frame, and not controlling the CCA threshold or controlling the CCA threshold so that the frame can be receivable if the destination station and its own station cannot stop the demodulation of the received frame.

The wireless communication method according to the second invention further includes a fourth step checking a format of a frame scheduled to be transmitted, controlling the CCA threshold to a value higher than the default value if the format is the HE format, and not controlling the CCA threshold or controlling the CCA threshold so that the frame can be receivable if the format is the Non-HE format.

The wireless communication method according to the second invention further includes a fifth step checking a type of a frame scheduled to be transmitted, not controlling the CCA threshold or controlling the CCA threshold so that the frame can be receivable if the type is a frame type or a frame subtype necessary for communication control of each wireless station, and controlling the CCA threshold to a value higher than the default value if the type is not the frame type nor the frame subtype necessary for the communication control of each wireless station.

Effects

According to the present invention, dynamic control of a CCA threshold according to an interference power not only increases a transmission opportunity, but also stops demodulation processing of an interference frame and makes transmission processing and receiving processing possible. Thus, an improvement in throughput is achieved while transmissions are positively performed despite the interference frame.

Furthermore, a type of a receive frame is determined while simultaneous transmissions are positively utilized with the control of the CCA threshold or with the control of continuing/stopping of the demodulation processing. If data frame is not present, demodulation processing is continued and thus a management frame, such as a beacon frame, can be reliably received.

Furthermore, when it comes to a Non-HE station that cannot control stopping of the demodulation processing of the interference frame, while simultaneous transmissions are positively utilized with the control of the CCA threshold or with the control of the continuing/stopping of the demodulation processing, according to the standard and supported functionalities of a destination station for a transmit frame, the CCA threshold is not controlled, or control is performed in a manner that causes the CCA threshold to be a CCA threshold at which the interference frame is detectable. Thus, the simultaneous transmissions to the Non-HE station are avoided and a decrease in throughput can be avoided.

Furthermore, if the transmit frame is not in an HE format, while simultaneous transmissions are positively utilized with the control of the CCA threshold or with the control of the continuing/stopping of the demodulation processing, the CCA threshold is not controlled, or control is performed in a manner that causes the CCA threshold to be a CCA threshold at which the interference frame is detectable. Thus, the simultaneous transmissions to the Non-HE station are avoided and the decrease in throughput can be avoided.

Furthermore, if the transmit frame is the management frame, while simultaneous transmissions are positively utilized with the control of the CCA threshold or with the control of the continuing/stopping of the demodulation processing, the CCA threshold is not controlled, or control is performed in a manner that causes the CCA threshold to be a CCA threshold at which the interference frame is detectable. Thus, the simultaneous transmissions are avoided and the decrease in throughput can be avoided.

BRIEF DESCRIPTION OF THE DRAWINGS

FIG. 7 is a timing chart illustrating an example of operations in Steps S21, S23, and S24.

FIG. 10 is a flowchart illustrating an example of the procedure for the AP 1 to perform transmitting processing in a fourth embodiment of the present invention.

FIG. 11 is a timing chart illustrating an example of operations in Steps S44 and S45.

FIG. 14 is a diagram illustrating an example of control of a CCA threshold in the related art.

DETAILED DESCRIPTION OF THE EMBODIMENTS

Figure 1:
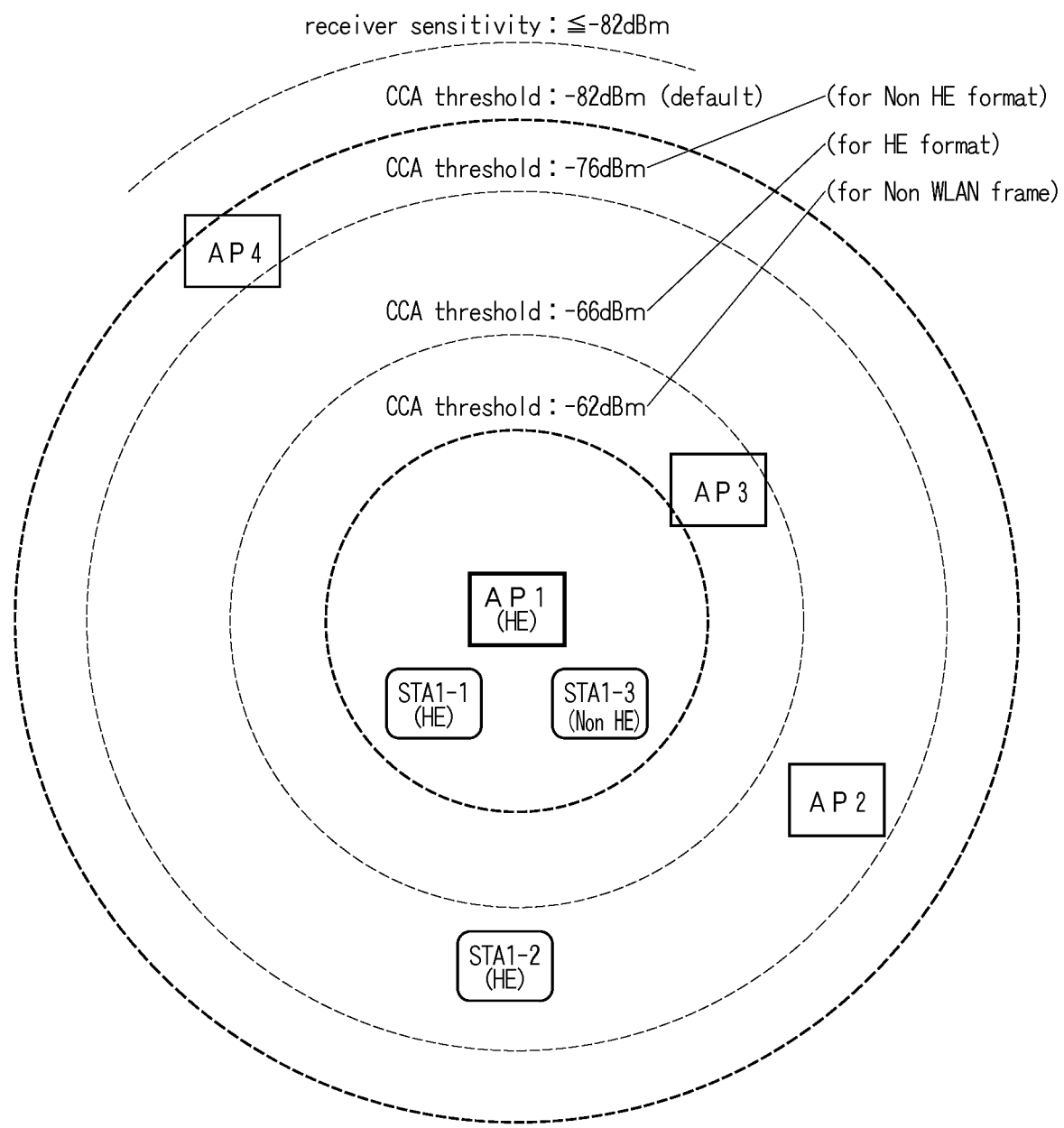
FIG. 1 is a diagram illustrating an example of a configuration of a wireless communication system according to the present invention.

FIG. 1 illustrates an example of a configuration of a wireless communication system according to the present invention.

In FIG. 1, an AP 1, an AP 2, an AP 3, and an AP 4 make up different BSSs, respectively, and the AP 1 and an STA 1-1, an STA 1-2, and an STA 1-3 make up the same BSS. It is possible that as a CCA threshold of the AP 1, −82 dBm is selected as default and that −76 dBm is selected for a Non-HE format, −66 dBm for an HE format, and −62 dBm for a Non-WLAN frame. A carrier sense range of the AP 1 is one that depends on the CCA threshold, and is indicated here by a circle for simplicity. Receiver sensitivity is assumed here to be a predetermined value of −82 dBm or less. It is noted that numerical values of the CCA threshold and the receiver sensitivity, as well as default values thereof, are examples.

With respect to the AP 1, the STA 1-1 and the STA 1-3 are present within a carrier sense range in accordance with a CCA threshold of −62 dBm for the Non-WLAN frame. With respect to the AP 1, the AP 3 is present between the carrier sense range in accordance with the CCA threshold of −62 dBm for the Non-WAN frame and a carrier sense range in accordance with a CCA threshold of −66 dBm for the HE format. With respect to the AP 1, the AP 2 and the STA 1-2 are present between the carrier sense range in accordance with the CCA threshold of −66 dBm for the HE format and a carrier sense range in accordance with a CCA threshold of −76 dBm for the Non-HE format. With respect to the AP 1, the AP 4 is present between the carrier sense range in accordance with the CCA threshold of −76 dBm for the Non-HE format and a carrier sense range accordance with a default CCA threshold of −82 dBm. In the AP 1, interference from the AP 2 to the AP 4 is observed according to the CCA threshold that is set in advance.

At this point, the AP 1, the STA 1-1, the STA 1-2 are assumed to be HE stations, and the STA 1-3 is assumed to be a Non-HE station. Therefore, the AP 1 transmits a frame at the HE format, which is destined for the STA 1-1 and the STA 1-2, and the AP1 transmits a frame at the Non-HE format, which is destined for the STA 1-3. A frame which is destined for the STA 1-1 and the STA 1-3 is assumed to be present in a transmission queue in the AP 1.

A control example in which a transmission opportunity is efficiently acquired in the AP 1 and system throughput is improved, and a control example in which a frame necessary for information collection, such as a beacon frame, is also efficiently acquired will be described below. In a first embodiment, a control example of a communication area resulting from setting the receiver sensitivity is described. In a second embodiment, a control example of each receive frame format is described. In a third embodiment, a control example of each receive frame type is described. In a fourth embodiment, an example of control for each standard of a destination station and each of the supported functionalities of the destination station is described. In a fifth embodiment, a control example of each transmit frame format or type is described.

First Embodiment

In the first embodiment, it is assumed that all stations which have to perform communication with the AP 1 are placed within a range of a single-digit meter in which tethering is performed. For example, in FIG. 1, if only the STA 1-1 and the STA 1-3 are present in the vicinity of the AP 1, receiver sensitivity of the AP 1, for example, is set to −62 dBm or more. Accordingly, it is possible that the AP 1 performs simultaneous transmissions to the STA 1-1 and the STA 1-3 more simply than the AP 1 controls the CCA threshold.

A control server, which is connected to each AP in a shared manner and in a wired or wireless manner, can set receiver sensitivity that corresponds to a communication area, which is controlled by each AP. In FIG. 1, the AP 1 measures receive signals from the STA 1-1 and the STA 1-3 or RSSIs of wireless signals that are transmitted from the AP 2 to AP 4 in the vicinity, and notifies the control server of results of the measurement. If the RSSIs from the STA 1-1 and the STA 1-3, which are measured by the AP 1, are sufficiently strong, the control server determines that the station is present close to the AP 1, and controls the receiver sensitivity. The receiver sensitivity, for example, is a value that is equal to or lower than the RSSIs from the STA 1-1 and the STA 1-3, and is set to be stronger than RSSIs from the AP 2 to the AP 4 in the vicinity, which are measured by the AP 1.

Furthermore, if a transmitted signal strength indication or an antenna gain of each STA or each AP is known, a RSSI from each STA or each AP may be corrected using these values. However, if it is determined that a RSSI from the AP 1, which is measured in the AP 2 to AP 4, causes an interference in any of the AP 2 to AP 4, and that throughput decreases, the receiver sensitivity of the AP 1 may not be controlled.

Second Embodiment

A feature of the second embodiment is that a CCA threshold of each receive frame format in the AP 1 is controlled. At this point, the CCA threshold is controlled to be a high value, for example, −66 dBm that is illustrated in FIG. 1, in such a manner that the simultaneous transmissions are positively performed in a frame in the HE format. From the perspective of the fairness, when it comes to a frame in the Non-HE format, the CCA threshold is controlled to be a default value, for example, −82 dBm that is illustrated in FIG. 1, or to be a value that is lower than the CCA threshold for the HE format, for example, −76 dBm that is illustrated in FIG. 1. It is noted that the CCA threshold for the HE format may be set to be in a fixed relationship to the CCA threshold for the Non-HE format, for example, be set to be higher by 10 dB, and so forth.

Figure 2:
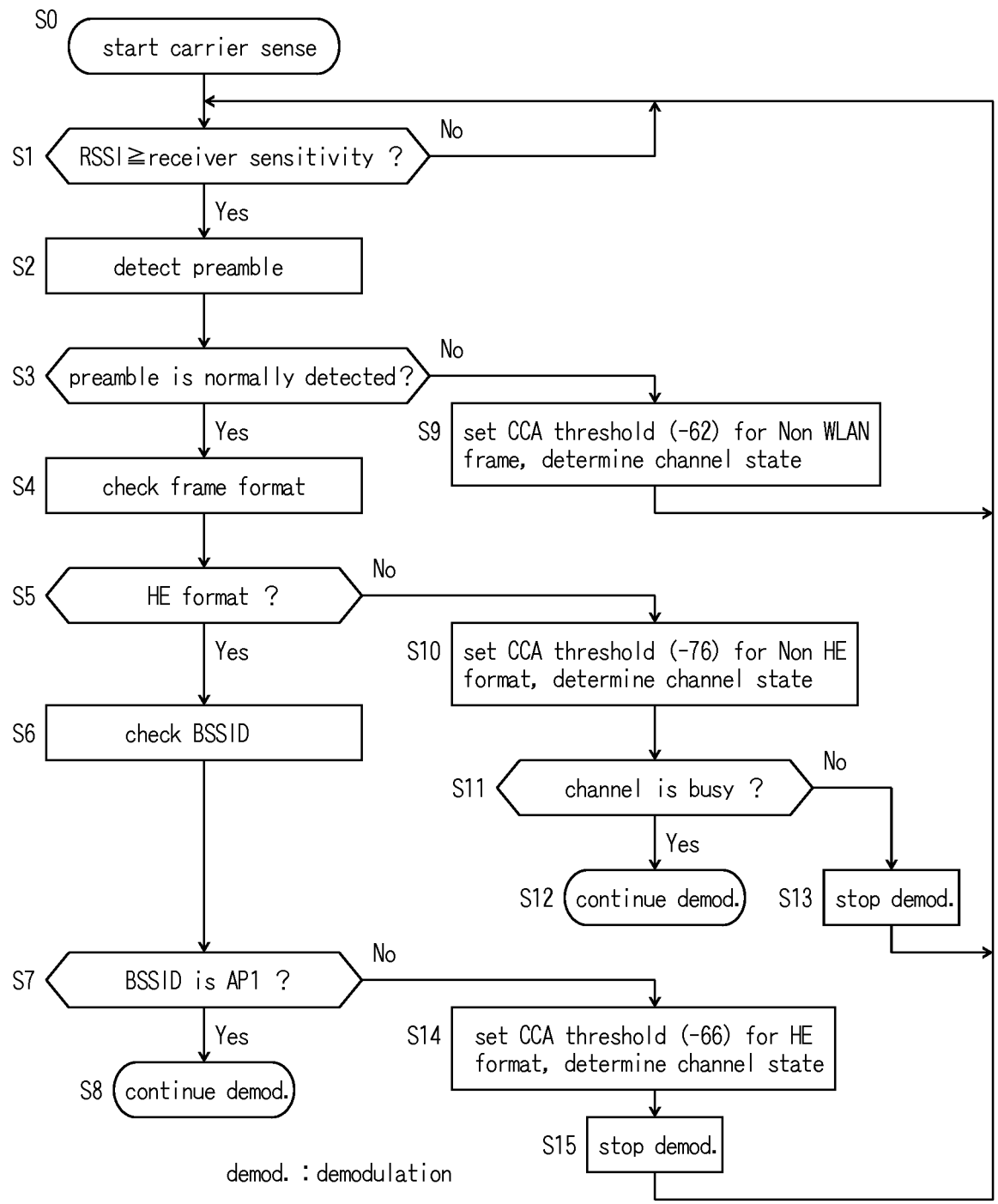
FIG. 2 is a flowchart illustrating a first example of a procedure for an AP 1 to perform receiving processing in a second embodiment of the present invention.

FIG. 2 illustrates a first example of a procedure for the AP 1 to perform receiving processing in the second embodiment of the present invention. It is noted that this holds true for another AP and STA.

In FIG. 2, the AP 1 starts to perform carrier sense at the default CCA threshold of −82 dBm (S0), and, if a received signal strength indication (RSSI) of a receive frame is at a receiver sensitivity of −82 dBm or below (Yes in S1), detects a preamble of the receive frame (S2). If the preamble is normally detected (Yes in S3), it is checked whether frame format is the HE format or the Non-HE format (S4). If the frame format is the HE format (Yes in S5), a BSSID in the preamble is checked (S6). If a BSSID of the receive frame is the BSSID of the AP 1 (Yes in S7), demodulation of the receive frame is continued (S8).

Furthermore, if the preamble of the receive frame is not detected normally in Step S3 (No in S3), it is determined that a wireless LAN frame is not present, setting to a CCA threshold of −62 dBm for the Non-WLAN frame takes place, and a channel state is determined (S9). This control is the same as that in Step S108, which is illustrated in FIG. 14. Narrowing down to the carrier sense range and determination of the channel state can cause the transmission opportunity to be increased.

Furthermore, if in Step S5, the receive frame is not in the HE format (No in S5), setting to the CCA threshold of −76 dBm for the Non-HE format takes place and the channel state is determined (S10). At this point, if a channel is busy (Yes in S11), the demodulation of the receive frame is continued (S12) and the simultaneous transmissions are deferred. On the other hand, if the channel is idle (No in S11), the demodulation of the receive frame is stopped (S13), and a state where the simultaneous transmissions are possible is set to be entered.

Furthermore, in Step S7, if the BSSID of the receive frame is not consistent with the BSSID of the AP 1 (No in S7), because a frame in the HE format from another BSS is received, setting to a CCA threshold of −66 dBm for the HE frame takes place and the channel state is determined (S14). Then, despite the fact that the channel is busy or idle, the demodulation of the receive frame is stopped (S15), and the simultaneous transmissions are set to be performed.

Figure 3:
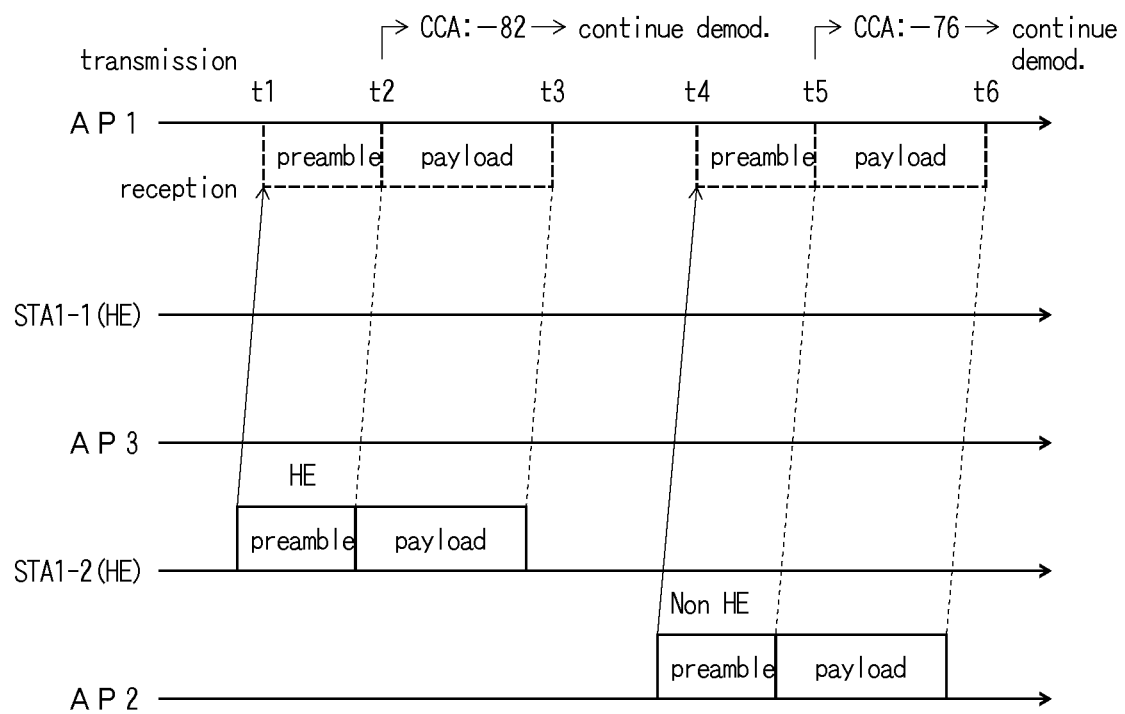
FIG. 3 is a timing chart illustrating an example of operations in Steps S8 and S12.

FIG. 3 illustrates an operational example of Steps S6 to S8 and S10 to S12. An example of an operation by the AP 1 that is to be performed when the frame in the HE format that is transmitted by the STA 1-2 is received and the frame in the Non-HE format that is transmitted by the AP 2 is received is described here.

In FIG. 3, at time t1, the AP 1 detects a RSSI that is stronger than the receiver sensitivity and starts to receive a frame. At time t2, the AP 1 normally receives the preamble of the receive frame, checks that the HE format is present, checks that the BSSID is the same as that of the BSS that the AP 1 itself makes up, and then continues the demodulation. At time t3, the AP 1 completes the frame demodulation. In this case, because it is determined that the received frame is a frame of the STA 1-2 that the AP 1 itself makes up, which needs to be demodulated, the demodulation is continued and the simultaneous transmissions are not performed.

It is noted that, if the frames in the HE format that are transmitted by the AP 2 to AP 4 are received, because the simultaneous transmissions are performed after the preamble is received in the processing in Step S15, the demodulation is stopped, but a description will be made of that with reference to FIGS. 4 and 5.

At time t4, the AP 1 detects the RSSI that is stronger than the receiver sensitivity and starts to receive the frame. At time t5, the AP 1 normally receives the preamble of the receive frame, checks that the Non-HE format is present, and causes the setting to the CCA threshold of −76 dBm for the Non-HE format to take place in the processing in Step S10. In the present example of the operation, because the frame is the receive frame from the AP 2 and the RSSI exceeds the CCA threshold, it is determined that the channel is busy and the demodulation is continued and the frame demodulation is completed at time t6. In this case, because a frame in the Non-HE format that is transmitted by the AP 2 that makes up another BSS is present, it is determined that there is a likelihood that the demodulation will be needed as is the case with, for example, the beacon frame or the like, and thus the demodulation is continued and the simultaneous transmissions are not performed. In this manner, although the CCA threshold is high, if the channel is busy, the simultaneous transmissions are avoided, and thus an influence of an interference on another BSS that is receiving the frame can be reduced.

On the other hand, when the setting to the CCA threshold of −76 dBm for the Non-HE format takes place in the processing in Step S10, because the RSSI from the AP 4 falls below the CCA threshold, the AP 1 that receives the frame in the Non-HE format from the AP 4 determines that the channel is idle, and the demodulation is stopped in the processing in Step S13. Thus, the simultaneous transmissions are possible. It is noted that the reception of the frame in the Non-HE format, such as the beacon frame that is transmitted by the AP 4 is possibly dealt with according to a procedure that will be described below in the third embodiment.

Figure 4:
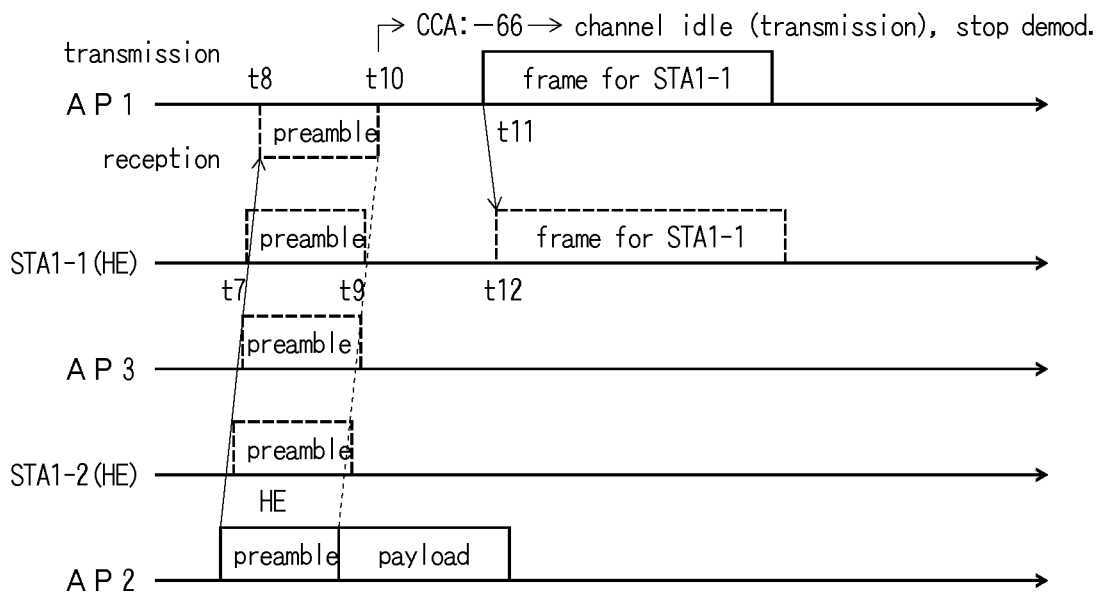
FIG. 4 is a timing chart illustrating a first example of operations in Steps S14 and S15.

FIG. 4 illustrates a first example of operations in Steps S14 and S15. An example of an operation by the AP 1 that is to be performed when the frame in the HE format that is transmitted by the AP 2 is received is described here.

In FIG. 4, the STA 1-1 and the AP 1 detect the RSSI that is stronger than the receiver sensitivity and start to receive the frame, at times t7 and t8, and normally receive the preamble of the receive frame and check that the HE format is present, at times t9 and t10. At this point, because the BSSID indicates that the AP 2 makes up another BSS, the setting to the CCA threshold of −66 dBm for the HE format takes place in the processing in Step S14 and the demodulation is stopped in the processing Step S15. In the present example of the operation, when the AP 1 performs the recognition as the frame from the AP 2 and raises the CCA threshold, because the RSSI falls below the CCA threshold of the AP 1, it is determined that the channel is idle, and the demodulation is stopped. Thus, the simultaneous transmissions are possible.

If the channel is idle until time t11 at which a fixed time+a random time have elapsed, the AP 1 transmits a frame that is destined for the STA 1-1. The STA 1-1 stops the demodulation at time t9, and detects the RSSI that is stronger than the receiver sensitivity and starts to receive the frame, at time t12.

In this manner, after detecting the preamble of the frame in the HE format that is transmitted by the AP 2 that makes up another BSS, the AP 1 causes setting to a high CCA threshold for the HE format to take place and stops the demodulation. Because of this, the AP 1, along with the AP 2, easily acquires the transmission right and performs the simultaneous transmissions. On the other hand, the STA 1-1 also stops the demodulation after detecting the preamble of another BSS, and, although the AP 2 is transmitting the frame, can normally demodulate the frame that is transmitted by the AP 1.

Figure 5:
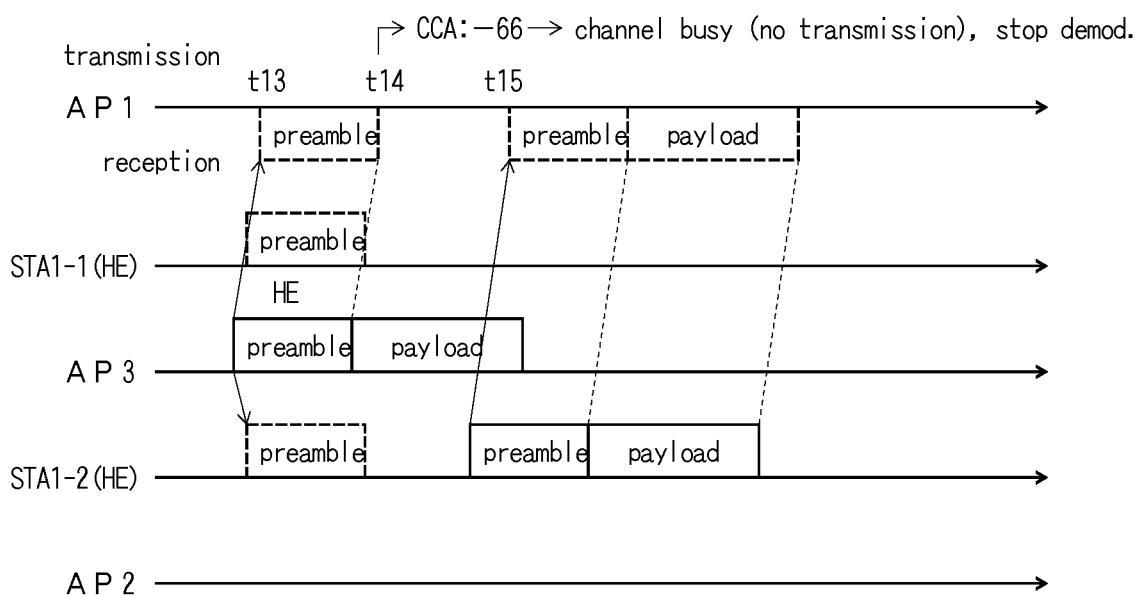
FIG. 5 is a timing chart illustrating a second example of the operations in Steps S14 and S15.

FIG. 5 illustrates a second example of the operations in Steps S14 and S15. An example of an operation by the AP 1 that is to be performed when the frame in the HE format that is transmitted by the STA 1-2 is received after the frame in the HE format that is transmitted by the AP 3 is received is described here.

In FIG. 5, the AP 1 detects the RSSI that is stronger than the receiver sensitivity and starts to receive the frame, at time t13, and normally receives the preamble of the receive frame and checks that the HE format is present, at time t14. At this point, because the BSSID indicates the AP 3 that makes up another BSS, the setting to the CCA threshold of −66 dBm for the HE format takes place in the processing in Step S14 and the demodulation is stopped in the processing in Step S15. In the present example of the operation, although the AP 1 performs the recognition as the frame from the AP 3 and raises the CCA threshold, because the RSSI exceeds the CCA threshold of the AP 1, it is determined that the channel is busy, and the simultaneous transmissions are deferred.

On the other hand, the STA 1-1 and the STA 1-2 also receive the frame in the HE format from the AP 3 and stops the demodulation. If the channel is idle, the STA 1-1 and the STA 1-2 possibly perform the transmission. At this point, if the RSSI from the AP 3 falls below the CCA threshold of −66 dBm for the HE format in the STA 1-2, it is determined that the channel is idle, and a frame that is destined for the AP 1 is transmitted. The AP 1 stops the demodulation of the frame from the AP 3, at time t14, and detects the RSSI that is stronger than the receiver sensitivity and starts to receive the frame from the STA 1-2, at time t15.

In this manner, after detecting the preamble of the frame in the HE format that is transmitted by the AP 3 that makes up another BSS, the AP 1 causes the setting to the high CCA threshold for the HE format to take place and stops the demodulation, but the RSSI of the frame from the AP 3 is stronger than the CCA threshold of the AP 1, the channel is busy and the simultaneous transmissions are deferred without being performed. On the other hand, after detecting the preamble of another BSS, the STA 1-2 raises the CCA threshold and stops the demodulation, and if the channel is idle, the transmission of the frame is possible. However, although the AP 3 is transmitting a frame, if the STA 1-2 can transmit a frame, the AP 1 can normally demodulate the frame.

In examples in FIG. 4 and FIG. 5, if, with the BSSID that is detected as a result of demodulating the preamble of the frame in the HE format in the processing in each of Steps S6 and S7 in FIG. 2, it is determined in the AP 1 that the frame from the AP 2 or the AP 3 that makes up another BSS is present, the default CCA threshold of −82 dBm is raised to the CCA threshold of −66 dBm for the HE format in the processing in Step S14 in FIG. 2. At this point, the frame of the AP 2 is not detected and the channel is idle. The frame of the AP 3 remains detected and the channel is busy. However, any AP 1 stops the demodulation. In the example in FIG. 4, the AP 1 possibly performs the transmission and in the example in FIG. 5, the AP 1 possibly performs the reception.

Incidentally, if the receive frame is in the HE format and is determined as the frame of another BSS in the processing in each of Steps S6 and S7 in FIG. 2, in some cases, it is also desirable that in the AP 1, when it comes to a form of the receive frame, the channel is set to be busy without performing processing that controls the CCA threshold that is described with reference to Step S14.

For example, in new wireless LAN specifications, a functionality is assumed that allows a plurality of STAs which receive a trigger frame from the AP to simultaneously transmit a UL MU frame to the AP using uplink (UP) multi-user MIMO (MU-MIMO). If another AP starts to perform transmission to the trigger frame, the STA cannot transmit the UL MU frame, or although the STA transmits the UL MU frame, there is a concern in which quality will be remarkably degraded due to the interference. In order to deal with this concern, if signaling information is added to a predetermined field within a preamble of the trigger frame, for example, it is determined in the processing in each of Steps S6 and S7 in FIG. 2 that a frame of another BSS is present, and the predetermined signaling information is detected from the preamble, control is performed in such a manner that it is determined that the channel is busy, without performing the CCA threshold, or in such a manner that although the transmission opportunity is acquired with the CCA threshold control, the transmission is set to be performed within the duration of the trigger frame. On the other hand, if the signaling information is not detected in the frame, the setting to the CCA threshold of −66 dBm for the HE format takes place in the processing in Step S14 in FIG. 2 and the processing for channel state determination may be started.

Figure 6:
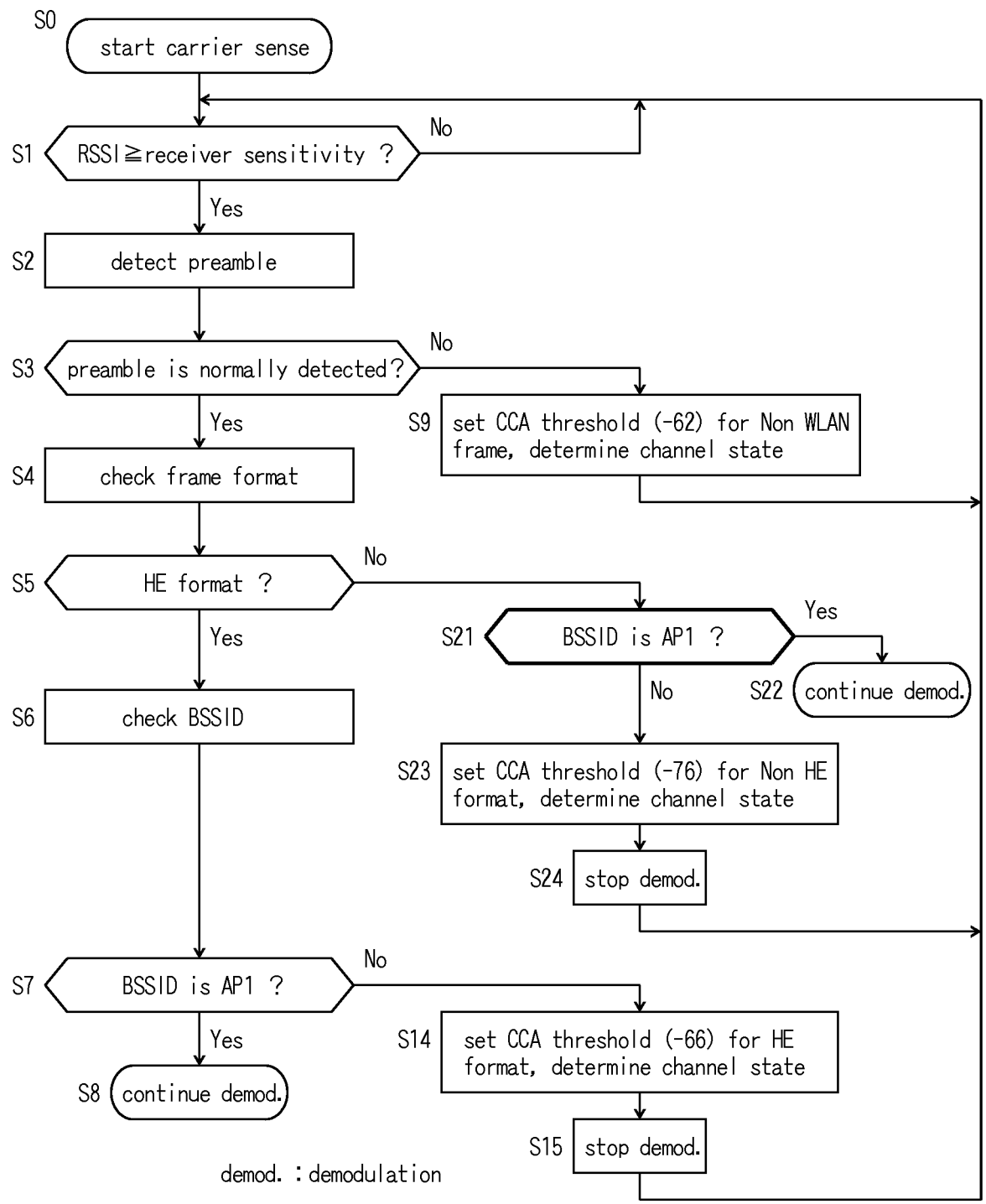
FIG. 6 is a flowchart illustrating a second example of the procedure for the AP 1 to perform the receiving processing in a second embodiment of the present invention.

FIG. 6 illustrates a second example of the procedure for the AP 1 to perform the receiving processing in the second embodiment of the present invention. It is noted that this holds true for another AP and STA.

In FIG. 6, processing in each of Steps S0 to S9, S14, and S15 are the same as those in the first example of the procedure for the AP 1 to perform the receiving processing, which is illustrated in FIG. 2.

If in Step S5, the receive frame is not in the HE format (No in S5), the AP 1 checks the BSS ID within a MAC header in the Non-HE format, and determines whether or not the BSS ID is consistent with the BSS that the AP1 itself makes up (S21). If the BSS ID is consistent with the BSS that the AP 1 itself makes up (S22), the AP 1 continues the demodulation and defers the simultaneous transmissions. On the other hand, if the BSS ID in the receive frame is not consistent with the BSS that the AP1 itself makes up, the setting to the CCA threshold of −76 dBm for the Non-HE format takes place, the channel state for performing the simultaneous transmissions is determined (S23), and the demodulation of the receive frame is stopped (S24).

FIG. 7 illustrates an example of an operation in each of Steps S21, S23, and S24.

An example of an operation by the AP 1 that is to be performed when the frame in the HE format that is transmitted by the STA 1-2 is received after the frame in the Non-HE format that is transmitted by the AP 3 is received is described here.

In FIG. 7, the AP 1 detects the RSSI that is stronger than the receiver sensitivity and starts to receive the frame, at time t16, and normally receives the preamble of the receive frame, checks that the Non-HE format is present and checks the MAC header at time t17. Then, at time t18, because it is checked that the BSS ID within the MAC header indicates another BSS, the setting to the CCA threshold of −76 dBm for the Non-HE format takes place in the processing in Step S23, and the demodulation is stopped in the processing in Step S24. In the present example of the operation, the AP 1 stops the demodulation when receiving the frame from the AP 3, but because the RSSI exceeds the CCA threshold for the Non-HE format, it is determined that the channel is busy, and the simultaneous transmissions are deferred.

On the other hand, the STA 1-1 and the STA 1-2 also receive the frame in the Non-HE format from the AP 3 and stop the demodulation. If the channel is idle, the STA 1-1 and STA 1-2 possibly perform the transmission. At this point, if the RSSI from the AP 3 falls below the CCA threshold of −76 dBm for the Non-HE format in the STA 1-2, it is determined that the channel is idle, and the frame that is destined for the AP 1 is transmitted. The AP 1 stops the demodulation of the frame from the AP 3, at time t18, and detects the RSSI that is stronger than the receiver sensitivity and starts to receive the frame, at time t19.

In this manner, the AP 1 stops the demodulation after detecting the BSS ID in the frame in the Non-HE format that is transmitted by the AP 3 that makes up another BSS, and causes the setting to the CCA threshold for the Non-HE format to take place, but because the RSSI of the frame that is transmitted by the AP 3 is stronger than the CCA threshold, the simultaneous transmissions are deferred without being performed. On the other hand, the STA 1-2 also stops the demodulation after receiving the frame of another BSS, and possibly transmits the frame. Therefore, although the AP 3 is performing the transmission, the AP 1 can normally demodulate the frame that is transmitted from the STA 1-2.

It is noted that, if the frame in the Non-HE format that is transmitted by the STA 1-3 that makes up the BSS that the AP 1 itself makes up is received, because the BSS ID in the received frame is consistent with the BSS that the AP 1 itself makes up, the demodulation can be continued in the processing in each of Steps S21 and S22.

Third Embodiment

A feature of the third embodiment is that each type of the receive frame in the AP 1 is controlled. At this point, a frame type is read when receiving the frame, and is received and demodulated as is. However, the demodulation is stopped, and thus, it is selected whether or not the simultaneous transmissions are set to be possible. For example, if a data frame is received, the simultaneous transmissions are positively performed. Although a frame of another BSS is present, if a management frame is present such as a beacon frame of the AP or an association request frame of the STA, the simultaneous transmissions are kept from being performed, and the reception and the demodulation are preferentially performed. It is noted that because a control frame, such as an RTS, a CTS, or an ACK, has a short frame time length, the advantage of switching the control to the simultaneous transmissions is so small that the control frame may be received and demodulated as is and may be utilized for information collection.

Figure 8:
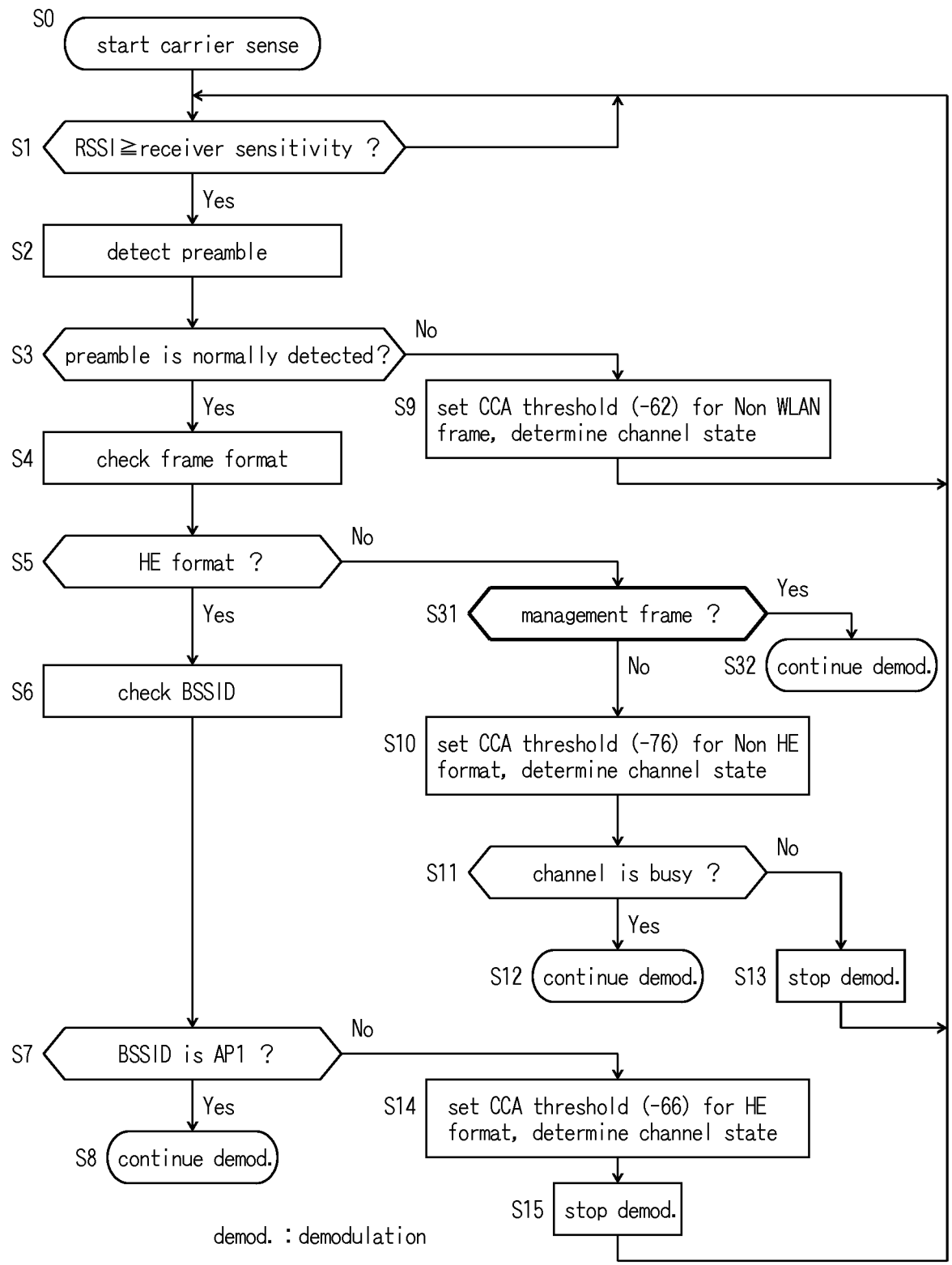
FIG. 8 is a flowchart illustrating an example of the procedure for the AP 1 to perform the receiving processing in a third embodiment of the present invention.

FIG. 8 illustrates an example of the procedure for the AP 1 to perform the receiving processing in the third embodiment of the present invention. It is noted that this holds true for another AP and STA.

In FIG. 8, processing in each of Steps S0 to S15 are the same as those in the first example of the procedure for the AP 1 to perform the receiving processing in the second example, which is illustrated in FIG. 2.

In Step S5, if the receive frame is not in the HE format (No in S5), the AP 1 checks the frame type, determines whether or not a frame type or a frame subtype, for example, the management frame, which is necessary for communication control by each wireless station, is present (S31), continues the demodulation if the management frame is present (S32), and defers the simultaneous transmissions. On the other hand, if the data frame is present, as in the second embodiment that is illustrated in FIG. 2, the setting to the CCA threshold (−76 dBm) for the Non-HE format takes place, and the channel state is determined (S10). At this point, if the channel is busy (Yes in S11), the demodulation of the data frame is continued (S12) and the simultaneous transmissions are deferred. On the other hand, if the channel is idle (No in S11), the demodulation of the data frame is stopped (S13), and the state where the simultaneous transmissions are possible is set to be entered. That is, the third embodiment results from adding the processing that preferentially continues the demodulation when the frame in the Non-HE format is present and the management frame, such as the beacon frame, is present, to the second embodiment.

Figure 9:
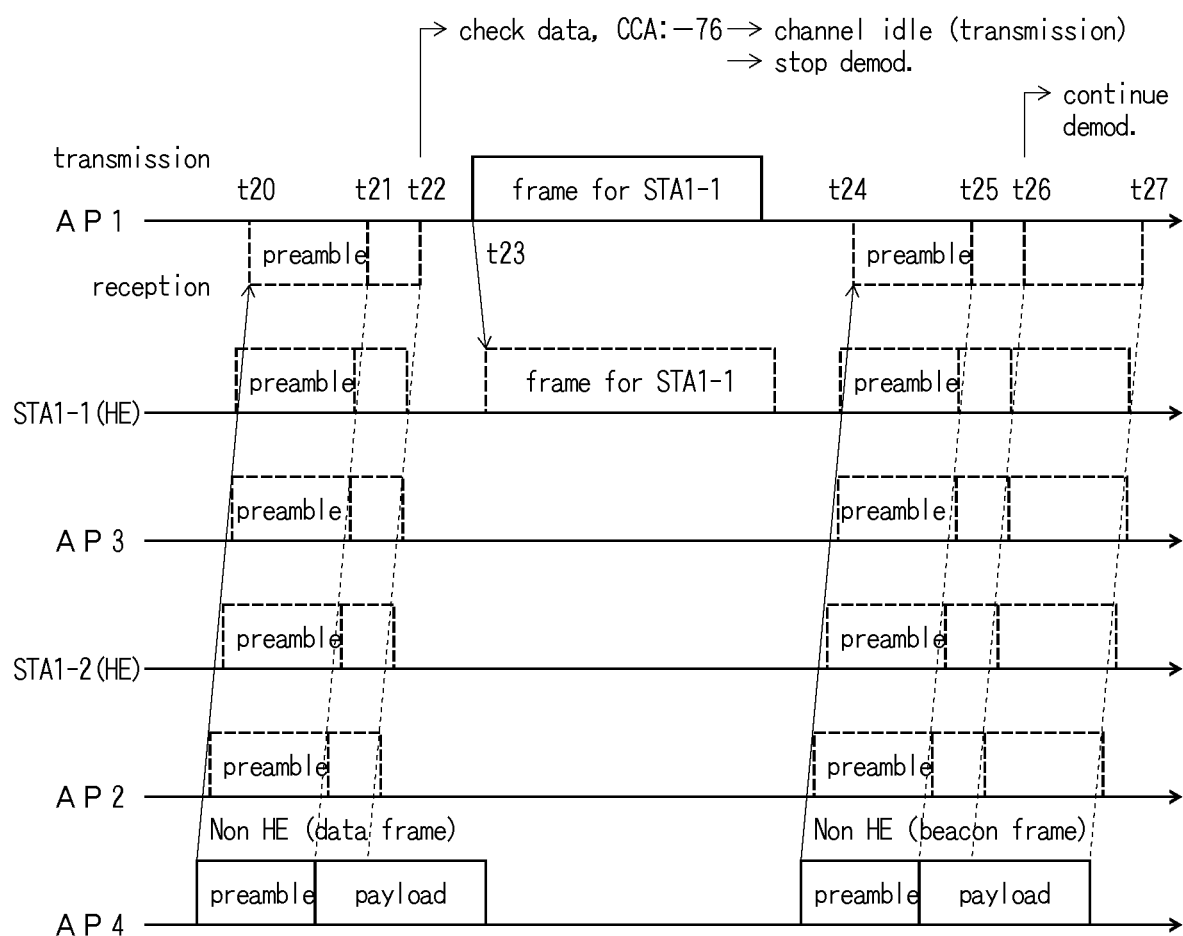
FIG. 9 is a timing chart illustrating an example of operations in Steps S10 to S13, S31, and S32.

FIG. 9 illustrates an operational example of Steps S10 to S13, S31 and S32. An example of an operation by the AP 1 that is to be performed when the data frame in the Non-HE format and the beacon frame that are transmitted by the AP 4 are received is described here.

In FIG. 9, the AP 1 detects the RSSI that is stronger than the receiver sensitivity and starts to receive the frame, at time t20, normally receives the preamble of the receive frame and checks that the Non-HE format is present, at time 21, and checks that the frame type within the MAC header is data, at time t22. Because of the checking at times t21 and t22, the AP 1 causes the CCA threshold of −76 dBm for the Non-HE format to take place in the processing in Step S10. In the present example of the operation, the AP 1 stops the demodulation when receiving the data frame from the AP 4, but because the RSSI falls below the CCA threshold for the Non-HE format, it is determined that the channel is idle, and the simultaneous transmissions are possible.

If the channel is idle until time t23 at which a fixed time+a random time have elapsed, the AP 1 transmits the frame that is destined for the STA 1-1. The STA 1-1 also stops the demodulation, detects the RSSI that is stronger than the receiver sensitivity, and starts to receive the frame.

The AP 1 detects the RSSI that is stronger than the receiver sensitivity and starts to receive the frame, at time t24, and normally receives the preamble of the receive frame, checks that the Non-HE format is present and checks the frame type at time t25. Because it is checked at time t26 that the frame type within the MAC header is the management frame, the demodulation is continued in the processing in Step S32 and the frame demodulation is completed at time t27. If the frame is the beacon frame, the RSSI can be recorded, or BSS information of a transmission source AP, or the like can be acquired from information within the frame and the acquired information or the like can be recorded.

In this manner, in the AP 1, when the simultaneous transmissions are performed on the beacon frame or an association frame, and thus receiver quality is degraded, because this exerts an influence on a connection to the wireless LAN itself, the management frame is preferentially received and the simultaneous transmissions are kept from being performed.

Furthermore, because the beacon frame or the like does not normally use MIMO, the beacon frame or the like is suitable for measurement of the RSSI of the frame that is transmitted from the AP 4. Moreover, the BSS information (capabilities or the like) of the AP 4 can be acquired from information within the beacon frame.

Fourth Embodiment

A feature of the fourth embodiment is that transmission of each of the standard of the destination station and transmission of each of the supported functionalities of the destination station are controlled in the AP 1. At this point, because a condition for determining whether or not the frame reception is successful varies according to the standard and supported functionalities of the destination station, as in the embodiments described above, it is selected whether or not to perform the simultaneous transmissions based on information on the standard and supported functionalities of the destination station to which the transmission will be made, as well as a state of the receive frame. For example, if the destination station is the HE station, although the frame that causes interference is received from another BSS, as in the STA 1-1 that is illustrated in FIG. 4, the BSSID is identified and thus the demodulation can be early stopped. For this reason, in the destination station, although an asynchronous interference frame is received preferentially over a desired frame, the demodulation of the interference frame is stopped and the desired frame is possibly received normally. On the other hand, even if the Non-HE station that does not have this functionality is the destination station, when the CCA threshold is controlled to be high and is positively transmitted simultaneously, the desired frame arrives while the demodulation of the interference frame is in progress. As a result, the reception fails.

FIG. 10 illustrates an example of the procedure for the AP 1 to perform transmitting processing in the fourth embodiment of the present invention. It is noted that it is assumed that, in the AP and the STA, the procedure to perform the receiving processing, which is illustrated in FIGS. 2, 6, and 8, is executed. In FIG. 10, the AP 1 starts to prepare for the transmission (S40) and checks a destination of a frame that is scheduled for transmission (S41). At this point, the standard and supported functionalities of the frame that are supportable by the destination station are checked (S42), and it is determined whether or not the demodulation of the interference frame is possibly stopped (S43). For example, if the destination station is the HE station, when the frame in the HE format is recognized, the BSSID is further recognized in the preamble, and thus it is recognized that a frame from another BSS is present, it can be determined that the demodulation of what follows a preamble of the interference frame is possibly stopped. If the demodulation of the interference frame is possibly stopped in the destination station, CCA threshold control is performed (S44) and the channel state is determined (S46). For example, as is the case with the CCA threshold control in Steps S10, S14, and S23 in the procedure to perform the receiving processing in each of the embodiments described above, control is performed in such a manner that a value which is higher than the default CCA threshold is obtained, an opportunity for the channel to be idle is increased, and thus, the simultaneous transmissions are performed.

On the other hand, if the destination station is the Non-HE station, because the demodulation of the interference frame is impossible to stop, the AP 1 does not perform the CCA threshold control (S45), and determines the channel state (S46). For example, without performing the CCA threshold control in Steps S10, S14, and S23 in the procedure to perform the receiving processing in each of the embodiments described above, the default CCA threshold may be employed as is, or control may be performed to employ the CCA threshold at which the interference frame is detectable.

FIG. 11 illustrates an example of operations in Steps S44 and S45. An example is described here in which control is performed if the STA 1-1 that is the HE station is assumed to be a destination and if the STA 1-3 that is the Non-HE station is assumed to be a destination, when it is determined in the AP 1 whether or not the simultaneous transmissions are performed while the frame in the HE format is being received from the AP 2.

In (1) of FIG. 11, the AP 1 and the STA 1-1 that are the HE stations detect the RSSI that is stronger than the receiver sensitivity, and start to receive the frame, at time t28. Furthermore, the AP 1 and the STA 1-1 normally receive the preamble of the receive frame, check that the HE format is present, check that the BSSID indicates another BSS, and cause to the setting to the CCA threshold of −66 dBm for the HE format, at time t29. In the present example of the operation, the receive frame from the AP 2 is present. Furthermore, because the RSSI falls below the CCA threshold, it is determined that the channel is idle, the demodulation is stopped, and thus, the simultaneous transmissions are set to be possible. On the other hand, the STA 1-3 that is the Non-HE station detects the RSSI that is stronger than the receiver sensitivity and starts to receive the frame, at time t28, and normally receives the preamble of the receive frame, but cannot check that the HE format is present, at time t29. Therefore, when the default CCA threshold (−82 dBm) is employed as is, because the RSSI exceeds the CCA threshold, the STA 1-3 determines that the channel is busy, and the demodulation is continued.

If the channel is idle until time t30 at which a fixed time+a random time have elapsed, the AP 1 transmits the frame that is destined for the STA 1-1. The STA 1-1 stops the demodulation at time t29, and detects the RSSI that is stronger than the receiver sensitivity and starts to receive the frame, at time t30. It is noted that the STA 1-3 which is the Non-HE station continues the demodulation of the frame from the AP 2, but although the demodulation cannot be performed because the frame is in the HE format and the frame in the HE format that is destined for the STA 1-1 is further received, this does not exert any influence.

Situations at times t28 and t29 in (2) of FIG. 11 are the same as those in (1) of FIG. 11. The AP 1 and the STA 1-1 receive the preamble of the frame from the AP 2, and then stop the demodulation, but the STA 1-3 continues the demodulation of the frame from the AP 2. At this point, if the AP 1 transmits the frame in the Non-HE format that is destined for the STA 1-3 which is the Non-HE station, although the CCA threshold is controlled in such a manner that the channel is set to be idle and the transmission is performed at time t30 as illustrated in (1) of FIG. 11, the modulation cannot be performed in the STA 1-3 that continues the demodulation of the frame from the AP 2. Therefore, when the AP 1 sets the CCA threshold to be the default CCA threshold as is without controlling the CCA threshold, or performs control in such a manner that the CCA threshold at which the frame from the AP 2 is detectable is employed, because the channel is busy in the AP 1, the AP waits to perform the transmission until time t31 at which the AP 2 ends the transmission and the channel is idle. Accordingly, the normal reception is possible in the STA 1-3.

Fifth Embodiment

A feature of the fifth embodiment is that transmission of each format or type of a transmit frame is controlled in the AP 1.

In the fourth embodiment, with the standard and supported functionalities of the destination station for which a frame that is transmitted by the AP1 is destined, it is selected whether or not the simultaneous transmission are possible, depending on whether or not the demodulation of the interference frame is possibly stopped. However, if the frame that is transmitted by the AP 1 is in the HE format, or is the beacon frame, the management frame, or the like, the feature of the fifth embodiment, like those of the fourth embodiment, is that the CCA threshold is controlled and thus that it is selected whether or not the simultaneous transmissions are set to be possible.

Figure 12:
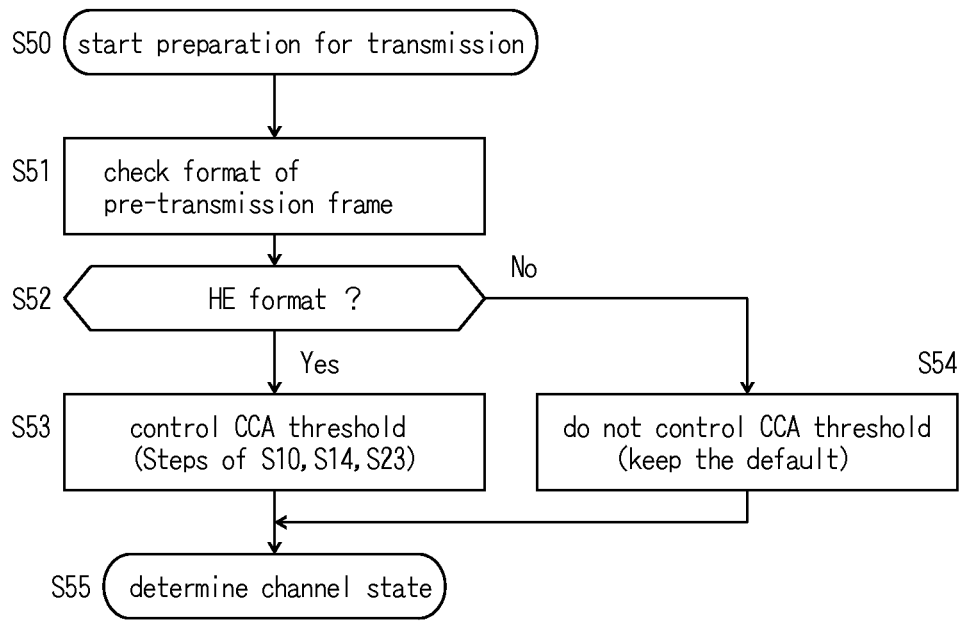
FIG. 12 is a flowchart illustrating a first example of a procedure for the AP 1 to perform the transmitting processing in a fifth embodiment of the present invention.

FIG. 12 illustrates a first example of a procedure for the AP 1 to perform the transmitting processing in the fifth embodiment of the present invention.

In FIG. 12, the AP 1 starts to prepare for the transmission (S50), checks the format of the frame that is scheduled for the transmission (S51), and determines whether or not the HE format is present (S52). At this point, if the frame that is scheduled for the transmission is the HE format, because the frame that is destined for the HE station which possibly stops the demodulation of the interference frame is present, the CCA threshold control is performed (S53) and the channel state is determined (S55). For example, as is the case with the CCA threshold control in Steps S10, S14, and S23 in the procedure to perform the receiving processing in each of the embodiments described above, control is performed in such a manner that a value which is higher than the default CCA threshold is obtained, an opportunity for the channel to be idle is increased, and thus, the simultaneous transmissions are performed.

On the other hand, if the frame that is scheduled for the transmission is in the Non-HE format, because there is a likelihood that the frame scheduled for the transmission will be the Non-He station that cannot stop the demodulation of the interference frame, the AP 1 does not perform the CCA threshold control (S54), and the channel state is determined (S55). For example, without performing the CCA threshold control in Steps S10, S14, and S23 in the procedure to perform the receiving processing in each of the embodiments described above, the default CCA threshold may be employed as is, or control may be performed to employ the CCA threshold at which the interference frame is detectable.

That is, if the transmit frame is in the HE format, as is the case with the transmit frame that is destined for the STA 1-1 that is the HE station which is illustrated in (1) of FIG. 11, the CCA threshold control is performed, and thus, the simultaneous transmissions are set to be possible. On the other hand, if the transmit frame is in the Non-HE format, as is the case with the transmit frame that is destined for the STA 1-3 that is the Non-HE station which is illustrated in (2) of FIG. 11, the transmission by the AP 2 is ended and the channel is idle, and then the transmission is performed.

Figure 13:
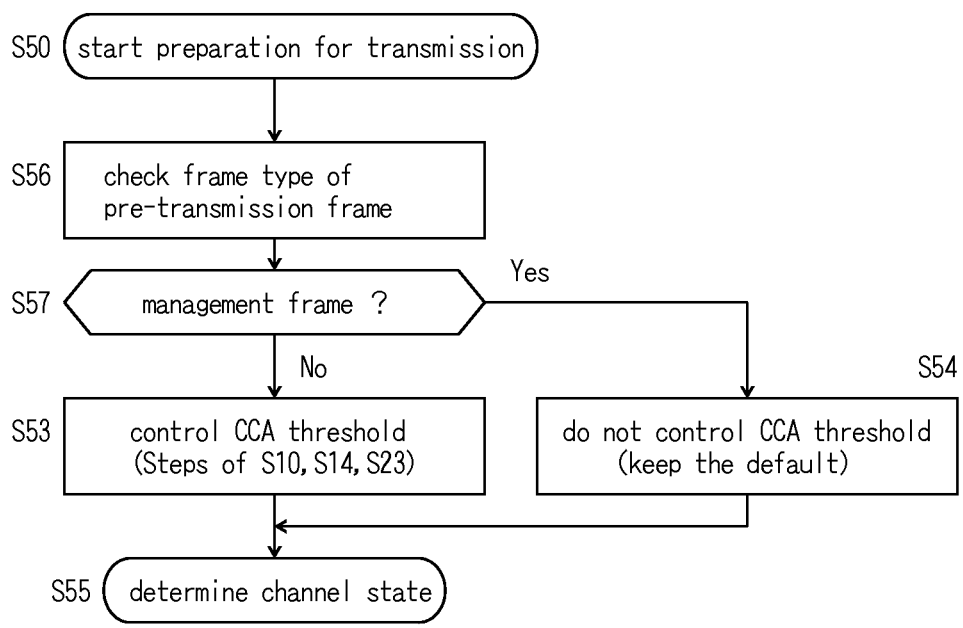
FIG. 13 is a flowchart illustrating a second example of the procedure for the AP 1 to perform the transmitting processing in the fifth embodiment of the present invention.
Figure 15:
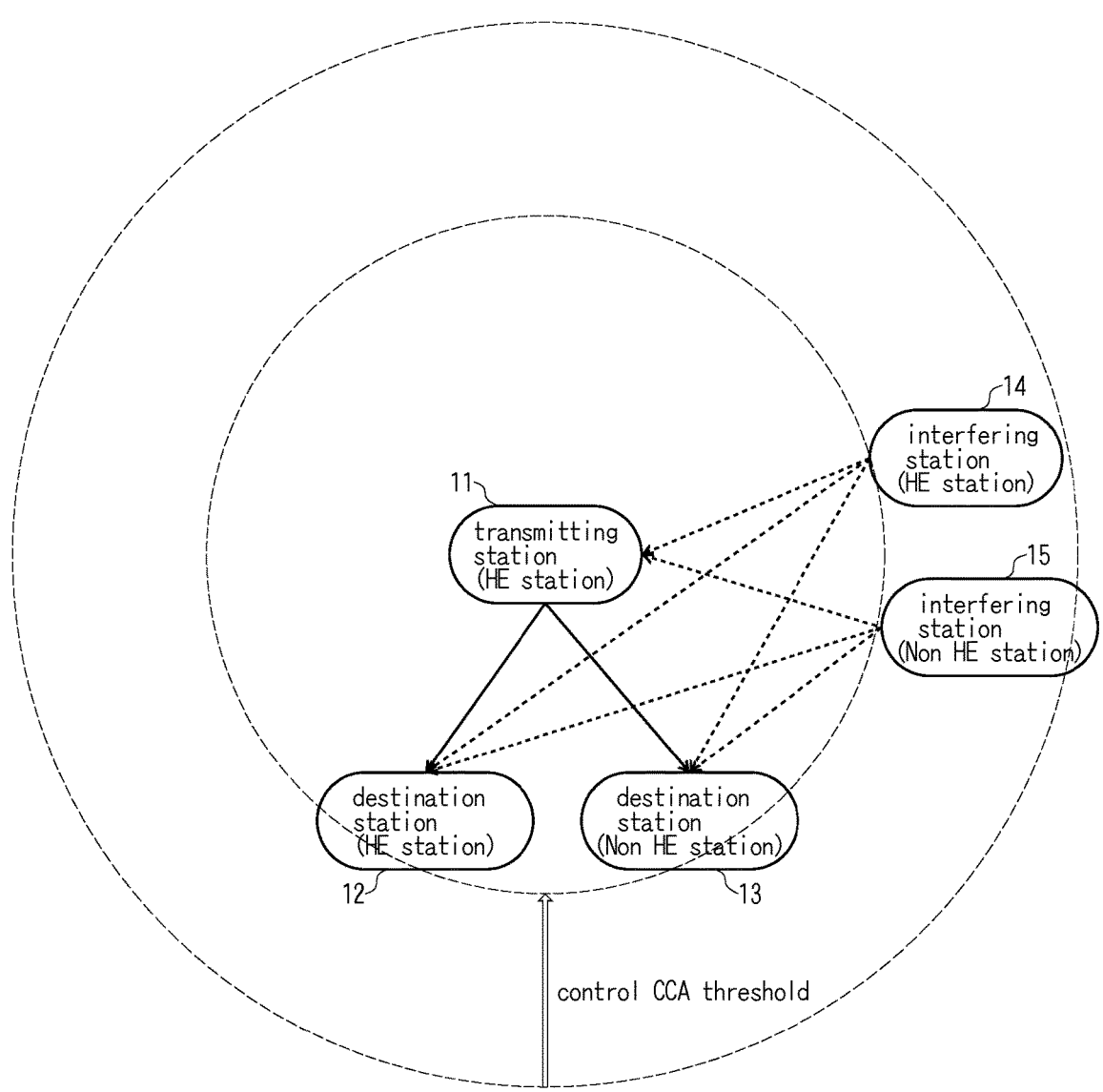
FIG. 15 is a diagram illustrating an example of a configuration of a wireless communication system in which a wide variety of stations are present.

FIG. 13 illustrates a second example of the procedure for the AP 1 to perform the transmitting processing in the fifth embodiment of the present invention.

In FIG. 13, the AP 1 starts to prepare for the transmission (S50), checks the type of the frame that is scheduled for the transmission (S56), and determines whether or not a frame type or a frame subtype, which is necessary for the communication control by each wireless station, for example, the management frame is present (S57). If the management frame is not present and for example, the data frame is present, the CCA threshold control is performed (S53) and the channel state is determined (S55). For example, as is the case with the CCA threshold control in Steps S10, S14, and S23 in the procedure to perform the receiving processing in each of the embodiments described above, control is performed in such a manner that a value which is higher than the default CCA threshold is obtained, an opportunity for the channel to be idle is increased, and thus, the simultaneous transmissions are performed.

On the other hand, if the management frame is present, because even the Non-HE station that cannot stop the demodulation of the interference frame needs to perform the reception, the AP 1 does not perform the CCA threshold control (S54), and determines the channel state (S55). For example, without performing the CCA threshold control in Steps S10, S14, and S23 in the procedure to perform the receiving processing in each of the embodiments described above, the default CCA threshold may be employed as is, or control may be performed to employ the CCA threshold at which the interference frame is detectable.

That is, if the transmit frame is the data frame, as is the case where the transmit frame that is destined for the STA 1-1 which is the HE station that is illustrated in (1) of FIG. 11, the CCA threshold control is performed and the simultaneous transmissions are set to be possible. On the other hand, if the transmit frame is the management frame, as is the case with the transmit frame that is destined for the STA 1-3 that is the Non-HE station which is illustrated in (2) of FIG. 11, the transmission by the AP 2 is ended and the channel is idle, and then the transmission is performed.

The many features and advantages of the embodiments are apparent from the detailed specification and, thus, it is intended by the appended claims to cover all such features and advantage of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. A wireless communication station which transmits and receives a frame using a channel by access control for transmission based on carrier sense multiple access with collision avoidance (CSMA/CA) using a clear channel assessment threshold (CCA threshold), wherein:
   a format that includes a field for an identifier of a basic service set (BSS) within a preamble of the frame is defined as a high efficiency (HE) format;
   said wireless communication station comprising
   a processor; and
   a storage medium having computer program instructions stored thereon, when executed by the processor, perform to:
   check the identifier of BSS within a preamble of a received frame; and
   use a first CCA threshold and perform the access control for transmission if the identifier of BSS within the preamble of the received frame is consistent with its own BSS;
   check a type of the received frame if the identifier of BSS within the preamble of the received frame is not consistent with its own BSS; and
   continue demodulation of the received frame if the type is a predetermined control frame including acknowledgment (ACK) and Clear to Send (CTS); and
   use a second CCA threshold that differs from the first CCA threshold and perform the access control for transmission if the type is not the predetermined control frame.

* * * * *